US009013786B2

(12) United States Patent
Fermann et al.

(10) Patent No.: US 9,013,786 B2
(45) Date of Patent: Apr. 21, 2015

(54) HIGH POWER PARALLEL FIBER ARRAYS

(71) Applicant: IMRA America, Inc., Ann Arbor, MI (US)

(72) Inventors: Martin Fermann, Dexter, MI (US); Ingmar Hartl, Hamburg (DE); Andrius Marcinkevicius, Saline, MI (US); Liang Dong, Clemson, SC (US)

(73) Assignee: IMRA America, Inc., Ann Arbor, MI (US)

( * ) Notice: Subject to any disclaimer, the term of this patent is extended or adjusted under 35 U.S.C. 154(b) by 11 days.

(21) Appl. No.: 14/048,177

(22) Filed: Oct. 8, 2013

(65) Prior Publication Data

US 2014/0036350 A1      Feb. 6, 2014

Related U.S. Application Data

(60) Continuation of application No. 13/457,576, filed on Apr. 27, 2012, now Pat. No. 8,736,954, which is a division of application No. 12/365,514, filed on Feb. 4, 2009, now Pat. No. 8,199,398.

(60) Provisional application No. 61/026,952, filed on Feb. 7, 2008.

(51) Int. Cl.
*H04B 10/17* (2006.01)
*H01S 3/067* (2006.01)
*H01S 3/13* (2006.01)
*H01S 3/23* (2006.01)

(52) U.S. Cl.
CPC ......... *H01S 3/06754* (2013.01); *H01S 3/06704* (2013.01); *H01S 3/1305* (2013.01); *H01S 3/2383* (2013.01)

(58) Field of Classification Search
USPC .................................. 359/341.1, 349; 372/25
See application file for complete search history.

(56) References Cited

U.S. PATENT DOCUMENTS 5,121,400 A    6/1992  Verdiell
5,378,888 A    1/1995  Stappaerts
(Continued)

FOREIGN PATENT DOCUMENTS

JP    10022555 A    1/1998
JP    11023867 A    1/1999
(Continued)

OTHER PUBLICATIONS

Burkhart et al., The National Ignition Facility Front-End laser System (Lawrence Livermore National Labs) 1st Annual International Conference on lasers for applicaiton to Inertial Confinement Fusion, Monterey, CA, May 30, 1995.
(Continued)

*Primary Examiner* — Eric Bolda
(74) *Attorney, Agent, or Firm* — Sughrue Mion, PLLC; Richard C. Turner

(57) ABSTRACT

High power parallel fiber arrays for the amplification of high peak power pulses are described. Fiber arrays based on individual fiber amplifiers as well as fiber arrays based on multi-core fibers can be implemented. The optical phase between the individual fiber amplifier elements of the fiber array is measured and controlled using a variety of phase detection and compensation techniques. High power fiber array amplifiers can be used for EUV and X-ray generation as well as pumping of parametric amplifiers.

28 Claims, 15 Drawing Sheets

(56) References Cited

U.S. PATENT DOCUMENTS

| | | |
|---|---|---|
| 5,566,196 A | 10/1996 | Scrifres |
| 5,694,408 A | 12/1997 | Bott |
| 5,717,516 A | 2/1998 | Klein et al. |
| 5,854,865 A | 12/1998 | Goldberg |
| 5,946,130 A | 8/1999 | Rice |
| 6,061,170 A | 5/2000 | Rice et al. |
| 6,233,085 B1 | 5/2001 | Johnson |
| 6,272,155 B1 | 8/2001 | Sekiguchi |
| 6,366,356 B1 | 4/2002 | Brosnan |
| 6,400,871 B1 | 6/2002 | Minden |
| 6,480,327 B1 | 11/2002 | Betin |
| 6,570,704 B2 | 5/2003 | Palese |
| 6,597,836 B2 | 7/2003 | Johnson |
| 6,678,288 B2 | 1/2004 | Rice |
| 6,701,049 B1 | 3/2004 | Awad |
| 6,704,479 B2 | 3/2004 | Koplow |
| 6,708,003 B1 | 3/2004 | Wickham |
| 6,766,075 B1 | 7/2004 | King et al. |
| 6,813,069 B2 | 11/2004 | Rice |
| 6,882,781 B2 | 4/2005 | Ionov |
| 7,065,110 B2 | 6/2006 | Rice |
| 7,088,743 B2 | 8/2006 | Rice et al. |
| 7,107,795 B2 | 9/2006 | Cheo |
| 7,120,175 B2 | 10/2006 | Rothenberg |
| 7,130,133 B2 | 10/2006 | Sun |
| 7,187,492 B1 | 3/2007 | Shay |
| 7,221,499 B2 | 5/2007 | Rice |
| 7,233,433 B1 | 6/2007 | Shay |
| 7,443,903 B2 | 10/2008 | Leonardo |
| 2001/0054977 A1 | 12/2001 | Courtney et al. |
| 2002/0131164 A1 | 9/2002 | Palese |
| 2003/0039015 A1 | 2/2003 | Vujkovic-Cvijin |
| 2003/0062468 A1* | 4/2003 | Byren et al. .......... 250/216 |
| 2004/0161239 A1 | 8/2004 | Bruesselbach et al. |
| 2005/0157969 A1 | 7/2005 | Imajuku |
| 2005/0238070 A1 | 10/2005 | Imeshev |
| 2006/0263024 A1 | 11/2006 | Dong |
| 2007/0086713 A1 | 4/2007 | Ingmar et al. |
| 2007/0201795 A1 | 8/2007 | Rice |
| 2010/0232007 A1* | 9/2010 | Byren et al. .......... 359/291 |

FOREIGN PATENT DOCUMENTS

| | | |
|---|---|---|
| JP | 2001044537 A | 2/2001 |
| JP | 2007110089 A | 4/2007 |
| WO | 2007034317 A2 | 3/2007 |
| WO | 2009/042347 A1 | 4/2009 |
| WO | 2008074668 | 4/2012 |

OTHER PUBLICATIONS

S. Augst et al., Coherent beam combining and phase noise measurements of ytterbium fiber amplifiers, Opt. Lett., vol. 29, pp. 474 (2004).

C. Bellanger et al., Coherent fiber combining by digital holography, Opt. Lett., vol. 33, No. 24, pp. 2937, Dec. 2008.

N. Broderick et al., Large mode area fibers for high power application, N. Broderick, H. Offerhaus, D. Richardson, R. Sammut, J. Caplen, L. Dong, Optical Fiber Technology vol. 5 p. 185-196 (1999).

E. Cheung et al., 'Phase locking of a pulsed fiber amplifier', Opt. Soc. Conf. on Advanced Solid State Photonics, paper #WA2, (2008).

T. Y. Fan, 'Laser Beam Combining for High-Power High-Radiance Sources', IEEE J. Sel. Top. in Quantum Electronics, vol. 11, pp. 567 (2005).

J. W. Hardy et al., 'Real-time atmospheric compensation', J. Opt. Soc. Am., vol. 67, pp. 360 (1977).

H. Itoh et al., 'Femtosecond pulse delivery through long multi-mode fiber using adaptive pulse synthesis', J. J. Appl. Phys., vol. 45, 5761 (2006).

G. Lees et al., Q-switched erbium doped fibre laser utilising a novel large mode area fibre, G. Lees, D. Taverner, D.Richardson, L.Dong, T.Newson, Electronics Letters vol. 33 Is. 5 p. 393-394 (1997).

L. Michaille et al., 'Phase locking and supermode seletion in multicore photonic crystal fiber lasers with a large doped area, L.Michaille, C.Bennett, D.Taylor, T.Shepherd, J.Broeng, H.Simonsen, A.Petersson, Optics Letters, vol. 30 p. 1668 (2005).

T. R. O'Meara et al., 'The multidither principle in adaptive optics', J. Opt. Soc. Am., vol. 67, pp. 306 (1977).

X. Shen et al., 'Compensation for multimode fiber dispersion by adaptive optics', Opt. Lett., vol. 30, 2985 (2005).

M.Wrage et al., 'Combined phase locking and beam shaping of a multicore fiber laser by structured mirrors', M.Wrage, P.Glas, M.Leitner, Optics Letters vol. 26 p. 980 (2001).

Yi-Fei Chen et al., "Remote distribution of a mode-locked pulse train with sub 40-as jitter" Opt. Express 14, 12134-12144 (2006).

Japanese Office Action, (Notice of Reasons for Rejection) dated May 28, 2013, Patent Application No. 2010-545965.

* cited by examiner

HIGH POWER PARALLEL FIBER ARRAYS

CROSS REFERENCE TO RELATED APPLICATIONS

This application is a continuation application of U.S. application Ser. No. 13/457,576, filed Apr. 27, 2012, which is a divisional of U.S. application Ser. No. 12/365,514, filed Feb. 4, 2009, which claims benefit of Provisional Application No. 61/026,952, filed Feb. 7, 2008. The above-noted applications are incorporated herein by reference in their entirety.

BACKGROUND OF THE INVENTION

Field of the Invention

This invention relates to the field of ultra high peak power fiber laser systems.

Efficient amplification in fiber amplifiers generally requires extended amplifier lengths which result in substantial exposure of the fibers to self-focusing nonlinearities at elevated power levels. Indeed, it has been shown that due to self-focusing, the obtainable peak powers in fiber amplifiers are limited to around 5 MW.

In order to overcome the general nonlinear limitations of optical fibers, multicore fiber designs (D. Scrifres, U.S. Pat. No. 5,566,196, Cheo et al., U.S. Pat. No. 7,107,795) have been suggested. Multicore fiber designs spread the signal intensity over a large core area and thus mitigate any nonlinear effects. In order to obtain near diffraction limited output beams, it has further been suggested that passive locking between the individual cores can be implemented (Scrifres '196 and Cheo U.S. Pat. No. 6,031,850 and many others). Such passive phase locking schemes can be implemented in a variety of ways, for example by setting up multi-core fiber lasers within the constraints of an optical cavity. Diffraction effects can then be used to minimize the loss of the phase-locked cavity supermode versus all other cavity super modes (e.g. M. Wrage et al., Opt. Lett., 26, 980 (2001); L. Michaille et al., 'Phase locking and supermode selection in multicore photonic crystal fiber lasers with a large doped area', Opt. Lett., vol. 30, pp. 1668 (2005)). Passive phase-locking has also been demonstrated using fiber arrays, e.g. Shakir et al., U.S. Pat. No. 7,130,133 and Ionov et al., U.S. Pat. No. 6,882,781. These approaches are typically based on some type of mode-selection which leads to preferential oscillation of certain super-modes compared to all other modes. Typically, these passive coherent coupling techniques are based on cw laser signals. Moreover, the passive phase-locking approaches are difficult to implement and have limited scalability. Passive phase-locking has also been suggested based on nonlinear beam combination using photo-refractive materials in Verdiell et al., U.S. Pat. No. 5,121,400. However, photo-refractive materials have significant power limitations and are therefore not useful for high power applications.

As an alternative to such passive phase-coupling techniques, phase-conjugate mirrors have also been suggested to obtain near diffraction limited modes from complicated arrangements of fiber couplers and multi-mode fibers (Betin et al., U.S. Pat. No. 6,480,327). However, no reliable methods of using phase conjugation for the construction of high power fiber lasers have yet been designed.

As an alternative to passive phase locking of multi-core fibers or fiber arrays, incoherent and coherent addition of fiber lasers has been considered for overcoming the nonlinear limitations of single-core optical fibers. Incoherent addition is typically implemented via wavelength division multiplexing approaches using a linear array of fiber lasers, where each fiber laser is designed to operate on a different wavelength to allow wavelength combination via wavelength-selective optical elements (see for example, T. Y. Fan, 'Laser Beam Combining for High-Power High-Radiance Sources', IEEE J. Sel. Top. in Quantum Electronics, vol. 11, pp. 567 (2005). A limitation with this technique is that it is typically restricted to very small signal bandwidths and is thus preferably implemented with single-frequency fiber lasers. In coherent addition typically tiled and filled aperture approaches are distinguished as also described by Fan in (T. Y. Fan, 'Laser Beam Combining for High-Power High-Radiance Sources', IEEE J. Sel. Top. in Quantum Electronics, vol. 11, pp. 567 (2005)).

Coherent addition of multiple separate fibers is technically involved and very expensive with limited potential for real commercial application. Coherent addition of such fiber arrays (typically referred to as fiber phased arrays (FPA)) has been demonstrated by several groups (E. Bott et al., U.S. Pat. No. 5,694,408; Rice et al., U.S. Pat. No. 5,946,130); Brosnan et al., U.S. Pat. No. 6,366,356; Johnson et al., U.S. Pat. No. 6,233,085; M. Minden, U.S. Pat. No. 6,400,871; Rice et al., U.S. Pat. No. 6,597,836; Rice et al., U.S. Pat. No. 6,678,288; M. Wickham et al., U.S. Pat. No. 6,708,003; R. Rice et al., U.S. Pat. No. 6,813,069; R. Rice et al., U.S. Pat. No. 7,065,110; T. Shay et al., U.S. Pat. No. 7,187,492; Rothenberg et al., U.S. Pat. No. 7,120,175; Rice et al., U.S. Pat. No. 7,221,499 and S. Augst, 'Coherent beam combining and phase noise measurements of ytterbium fiber amplifiers', Opt. Lett., vol. 29, pp. 474 (2004)). All these systems were based on the tiled aperture approach and borrow heavily from phase control techniques developed for astronomy, i.e. J. W. Hardy et al., 'Real-time atmospheric compensation', J. Opt. Soc. Am., vol. 67, pp. 360 (1977) and T. R. O'Meara, 'The multidither principle in adaptive optics', J. Opt. Soc. Am., vol. 67, pp. 306 (1977). In astronomical applications, the atmospheric phase-front perturbations of an optical imaging system are compensated by dividing a large phase front into several independent sections and using adaptive mirrors and heterodyne type phase detection to stabilize the phase front in each individual section. With commercially available adaptive mirrors, phase-front perturbations can be compensated for atmospheric fluctuations with bandwidths up to the kHz regime. The multidither type phase control techniques lend themselves to tiled aperture coherent addition, however, to date none of the above references has demonstrated a filled aperture FPA.

Coherent addition in filled aperture configurations has been described by Fan in (T. Y. Fan, 'Laser Beam Combining for High-Power High-Radiance Sources', IEEE J. Sel. Top. in Quantum Electronics, vol. 11, pp. 567 (2005)) and subsequently also by Rice et al., in U.S. patent application Ser. No. 11/361,352. However, the system in '352 describes coherent addition of cw amplifiers and relies on heterodyne phase detection techniques with relatively large feedback loop bandwidths.

Indeed, the adoption of phase front correction techniques as known from astronomy to the phase control of FPAs has so far not been possible due to the very large bandwidth of the phase fluctuations observed in typical fiber amplifiers, which can produce noticeable phase fluctuations at frequencies up to 10-100 kHz (see for example S. Augst, 'Coherent beam combining and phase noise measurements of ytterbium fiber amplifiers', Opt. Lett., vol. 29, pp. 474 (2004)). Therefore phase control in FPA is generally performed with phase locked loops with heterodyne phase detection techniques with feedback loop bandwidths in the MHz range, which leads to the requirement for expensive acousto-optic frequency modulators which have to be incorporated into each independent beamlet to ensure appropriate phase control.

Moreover, coherent addition of FPA has mostly been demonstrated with cw fiber amplifiers seeded with narrow bandwidth cw laser sources and coherent addition of pulsed sources has had many limitations. For example in the work by Bott et al., U.S. Pat. No. 5,694,408, Bott only considered a tiled aperture system and no means were suggested for the reduction of nonlinearities in the fiber amplifiers when amplifying fs pulses. In the work by Palese et al., U.S. patent application Ser. No. 09/808,330 a pulsed source with a broad spectral bandwidth was spectrally split into a linear array of channels and each channel was amplified in an individual component of a fiber amplifier array. Subsequently the amplified spectral channels were recombined in a dispersive optical element. A limitation with this approach is the limited spectral filling fraction that is possible in the spectral splitting and recombination process.

In yet another work, (ref. E. Cheung et al., 'Phase locking of a pulsed fiber amplifier', Opt. Soc. Conf. on Advanced Solid State Photonics, paper #WA2, (2008)) an amplitude modulated cw beam was coherently locked to a non-modulated cw beam, which limits the spectral bandwidth of such a scheme and the obtainable pulse widths.

In yet another example, (Mourou et al., in 'Optical Pulse Amplifier with High Peak and High Average Power' in International Publication No. WO 2007/034317) coherent addition of pulses in fiber arrays is suggested, however no workable schemes for phase control of pulse fiber amplifiers were suggested. For example it was suggested to use the beat signal observed when interfering two time delayed chirped pulses for phase control. However, such a beat signal is only observable when the pulses overlap in time and especially for low repetition rate pulse sources this greatly complicates phase detection Coherent addition without spectral bandwidth limitation has been described in a coherently multiplexed FPA based on individual isolated fiber amplifier arrays or multicore fibers by Hartl et al., as disclosed in copending U.S. patent application Ser. No. 11/546,998, assigned to the assignee of the present invention. The disclosure of Ser. No. 11/546,998 is hereby incorporated by reference in its entirety.

As an alternative to the use of multi-core fiber to overcome the power limitations of optical fibers, highly multi-mode fibers have also been suggested. These multi-mode fibers have very large mode areas and thus high power signals can be propagated with much lower optical intensity compared to single-mode fibers. Using adaptive control of the input mode to such multi-mode fibers, the excitation of a single principle mode is possible using for example genetic algorithms for input control [H. Itoh et al., Temtosecond pulse delivery through long multi-mode fiber using adaptive pulse synthesis', J. J. Appl. Phys., 45, 5761 (2006); X. Shen et al., 'Compensation for multimode fiber dispersion by adaptive optics, Opt. Lett., 30, 2985 (2005)]. Such principle modes are stable over extended periods of time even in km length fibers (in the range of hundreds of ms), therefore relatively slow adaptive control based on genetic algorithms can be implemented to find the principle modes and adjust the fiber launch mode to track a given principle mode with time. Though these schemes can compensate for modal dispersion in multimode fibers, principle modes in a multimode fiber are generally not diffraction limited and of limited utility in high power laser applications.

Another method for expanding the power limitations of fiber technology has been the implementation of external enhancement cavities which can increase the power from a fiber amplifier by 1000-10,000 times using adaptive phase control between the enhancement cavity and a fiber amplifier (I. Hartl et al., U.S. patent application Ser. No. 11/546,998). The disadvantage of this technique is that it is generally very difficult to extract the optical power from an enhancement cavity without seriously affecting the possible cavity Q and the dispersive properties of the cavity.

Yet another method for expanding the peak power limits of fiber technology has been the implementation of parametric amplification schemes as recently described by Imeshev et al. in U.S. patent application Ser. No. 11/091,015. In such schemes a quantum amplifier is implemented as pump for the parametric amplifier. Generally a pulse stretcher can be inserted in front of the quantum amplifier to avoid B-integral problems in the quantum amplifier. The stretched pulses amplified in the quantum amplifier can further be compressed before being directed for pumping the parametric amplifier. For maximum utility in commercial applications of the system discussed by Imeshev in '015 the quantum amplifier can further be based on a fiber system. However, to date no system configuration allowing the use of multi-core fibers for the pumping of parametric amplifiers were described.

SUMMARY OF THE INVENTION

The present invention relates to the design of ultra-compact, high-power, high energy optical pulse sources and their applications.

In a first embodiment, near diffraction-limited high energy pulses are generated using chirped pulse amplification in coherently combined arrayed fiber amplifiers.

In a second embodiment, coherent addition of individual fiber amplifiers is simplified by implementing an amplifier array in the form of a multi-core fiber. The utilization of strong thermal coupling of the index fluctuations in the individual cores of multi-core fibers reduces the bandwidth of any phase fluctuations inside the fiber to levels controllable with adaptive optics with kHz level feedback bandwidths. Fiber mode coupling and a resulting power exchange between individual fiber cores is minimized by using well separated cores with minimal spatial overlap.

Arrays of fibers with tens of individual members can be implemented, allowing for the generation of pulses with peak powers 10-100 times higher than the self-focusing limit of optical fibers at average powers above the 100 W range.

The fiber arrays are fully compatible with cladding and side-pumping schemes and therefore power scalable with achievable output powers limited only by thermal considerations.

Fiber arrays based on polarization maintaining fibers can be implemented or alternatively, Faraday rotators in conjunction with double-pass schemes can be implemented to minimize polarization fluctuations at the output of the fiber arrays.

The utilization of multi-core fibers greatly reduces the complexity of fiber phased arrays, which is required to make them economically feasible for general use.

In a third embodiment, multi-core fiber arrays can be designed with densely packed fiber cores via the utilization of fibers with mode confinement via air-holes or general low index leakage channels. Alternatively, multi-fiber arrays can be used which can be split at the signal coupling end while being interconnected at the pump coupling end in order to minimize the optical complexity of the pump coupling scheme. Such strongly coupled multi-fiber arrays also greatly reduce the bandwidth requirements for coherent addition.

In a fourth embodiment complexity reduction is further enabled by the utilization of coherent spatial mode conversion techniques for efficient coupling of optical signals into fiber arrays. The Strehl ratio of coherently combined fiber arrays is also maximized using coherent spatial mode conversion techniques at the output of the fiber phased arrays and for coherent beam combination in a filled aperture configuration.

In a fifth embodiment the schemes for phase detection and control for fiber phased arrays according to the above embodiments are described. Optical phase control can be conducted with heterodyne phase detection in various configurations.

For example heterodyne phase detection can be implemented with a reference arm configured to interfere with the individual elements of the fiber phased array. To enable heterodyne phase detection, the reference arm is typically phase modulated at a frequency which is higher than the bandwidth of the random phase fluctuations between the individual elements of the phased array. The optical interference pattern is then detected with a detector array and phase detection electronics is used to control the optical path length in each array element using appropriate transducers, which are optically linked to the phased array.

Various options for appropriate transducers for control of the optical path lengths are possible, such as a mirror array operated in reflection.

Also various options can be implemented for phase detection. For example to control the optical phase of each fiber array element for pulses with low repetition rates, additional cw lasers at a wavelength different from the operation wavelength of the fiber amplifier array can be coupled into each array element and the whole phase detection can be performed at the wavelength of the cw lasers. Equally, the phase of optical leakage signals incorporated between the pulses can be used for phase detection.

Alternatively, optical dithering of appropriate transducers can be implemented to modulate the optical path length of each individual array element. Phase sensitive detection of the optical interference pattern between a non-modulated reference arm and the output of the fiber array can then be used to control the optical path length of each fiber array element.

Optical phase control can also be conducted based on adaptive optics schemes.

Optical phase control can also be implemented based on fast genetic algorithms to find and track the phase coherent supermode of a fiber phased array based on multicore fiber structures using the maximization of the Strehl ratio as optimization target.

The adaptive optics scheme can also be combined with digital holography schemes to compensate phase fluctuations between the fibers using a spatial light modulator which generates the complex conjugate of the phase fluctuations inside the fiber and adds those to the signal transmission path.

The embodiments described here can be used for high power machining applications, pumping of optical parametric amplifiers as well as for plasma, VUV, EUV and X-ray generation, or generally, where power scaling is desired but otherwise limited by nonlinear effects or device damage.

In a sixth embodiment, a parametric amplifier pumped by a pulsed coherently combined multi-core fiber or general fiber phased array is described.

BRIEF DESCRIPTION OF THE DRAWINGS

Aspects of the present invention will become more apparent by describing in detail exemplary, non-limiting embodiments thereof with reference to the accompanying drawings. The drawings are for illustrative purpose, and not to scale.

In the drawings.

DESCRIPTION OF THE EMBODIMENTS

Figure 1:
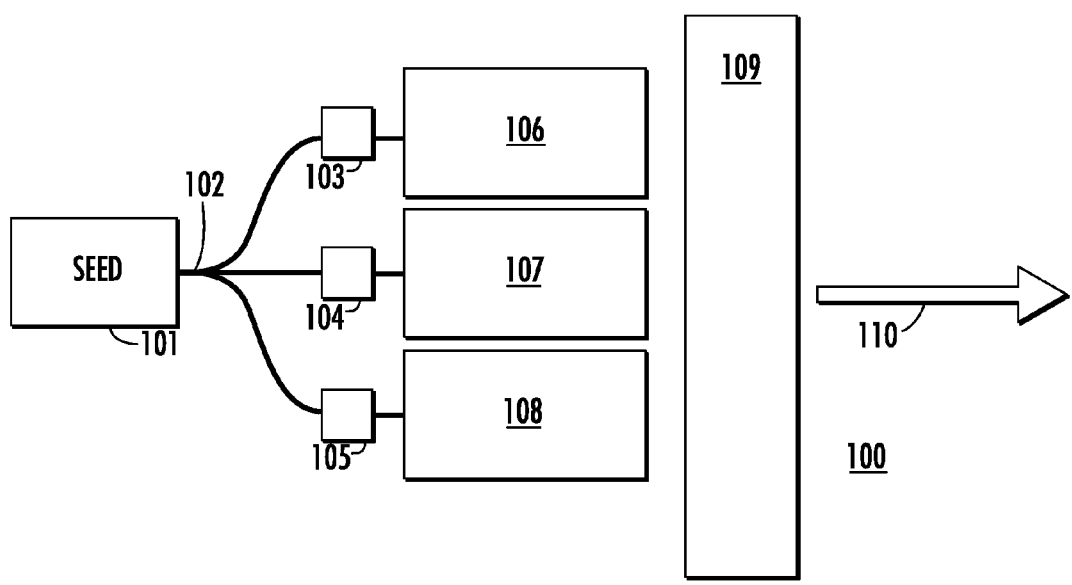
FIG. 1 is diagram of a generic scheme for the amplification of high energy pulses in a fiber phased array.

A design example according to a first embodiment is shown in FIG. 1. System 100 comprises a high power fiber phased array system for the generation of high power optical pulses. The pulses are generated in seed source 101, which can comprise a diode, fiber or solid state laser. The pulses can have a pulse width from the fs range to about 1 μs. These can further be stretched in time using dispersive optical elements. Elements for dispersive pulse stretching are well known from chirped pulse amplification systems and are not further discussed here. The optical pulses from seed source 101 are distributed into individual optical beam paths via coupler 102. Here an arrangement with a fiber optic coupler 102 is shown, but alternatively, bulk optical beam splitters or bulk diffractive elements could also be used to generate an array of optical beam paths. Phase control elements, for example modulators 103-105, are then inserted into the beam paths to enable phase control of the individual optical beam paths. The pulses propagating in the individual beam paths are then coupled into an array of fiber amplifiers 106-108. In order to achieve high output powers, the fiber amplifiers are typically double clad and any conventional pump coupling technique can be used for coupling pump light into these amplifiers. The output of the fiber amplifiers is combined optically via element 109, which can comprise a lens array as well as combinations of lens arrays and diffractive optical elements. At the output of the system a near diffraction-limited optical beam 110 is generated, where the phase control enabled via modulators 103-105 is used to optimize the Strehl ratio of the output beam 110. Additional bulk optical elements can be incorporated downstream of beam 110 for dispersive pulse compression. Such elements are well known from chirped pulse amplification systems and are not further discussed here.

Figure 2:
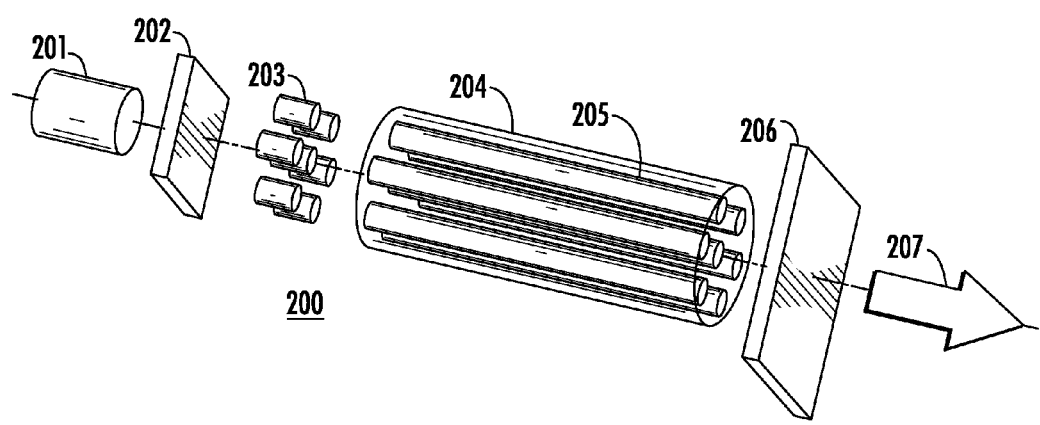
FIG. 2 is a diagram of a generic scheme for the utilization of multi-core fibers for the generation of near diffraction limited optical beams via coherent addition.

A design example according to a second embodiment is shown in FIG. 2. System 200 comprises a fiber phased array in the form of a multi-core fiber. Seed source 201 is split by optical element 202 into a number individual beams. The individual beams are passed through an array of phase control elements, (e.g.: modulators 203), which allow for independent phase control of each individual beam. The phase modulated beams are subsequently coupled into multi-core fiber amplifier 204, which comprises a number of individual cores 205. Here seven cores 205 are shown, but a higher number of cores is also possible. The multi-core amplifier 204 is typically double-clad, allowing for pumping with high power semiconductor lasers. Any conventional pump coupling technique can be used for coupling pump light into multi-core amplifier 204. The output of the multi-core fiber amplifier 204 is passed through optical beam shaping element 206, which can comprise an array of lenses and diffractive optical elements. At the output of the system a near diffraction-limited optical beam 207 is generated, where the phase control enabled via modulators 203 is used to optimize the Strehl ratio of the output beam 207. Additional bulk optical elements can be incorporated upstream of seed source 201 and downstream of beam 207 for dispersive pulse stretching and compression. Such elements are well known from chirped pulse amplification systems and are not further discussed here.

Figures 3A, 3B, 3C:
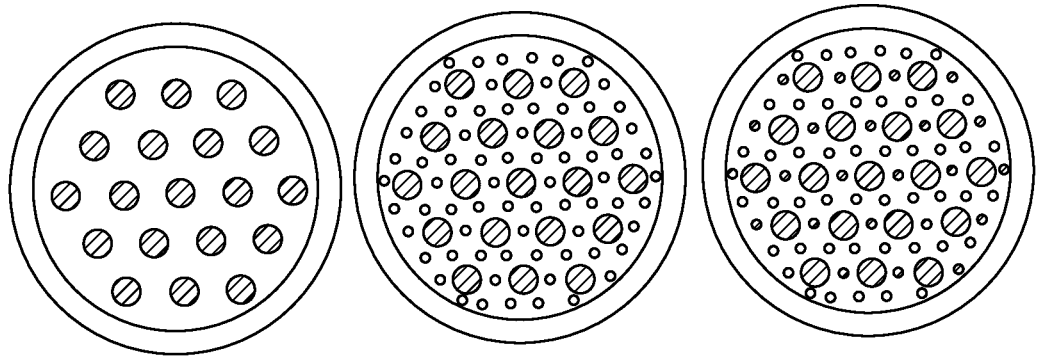
FIG. 3a is a cross sectional view schematically illustrating a multicore fiber comprising individual fiber cores based on step index fiber.
FIG. 3b is a cross sectional view schematically illustrating a multicore fiber comprising individual fiber cores based on leakage channel fiber.
FIG. 3c is a cross sectional view schematically illustrating a multicore fiber comprising individual fiber cores based on polarization maintaining leakage channel fiber.

A specific design example of the cross section of a multi-core fiber according to a third embodiment is shown in FIG. 3*a*. It comprises a fiber rod with a cladding diameter of 330 um and an isometric array of 19 single-mode fibers. The outside fiber diameter in this example is 400 μm. The core diameter of each individual core is 30 um and the core to core spacing is 60 um. A variety of core designs can be implemented, i.e. conventional step index fiber designs, microstructured fibers (L. Michaille et al., 'Phase locking and supermode selection in multicore photonic crystal fiber lasers with a large doped area', Opt. Lett., vol. 30, pp. 1668 (2005)). as well as leakage channel fibers (U.S. application Ser. No. 11/134,856 to Dong et al.) and Bragg fibers. All these fiber design are well known in the state of the art and not further described here. In all these designs Yb doping (or another rare-earth dopant) can be readily implemented in the core region to enable signal amplification. A thin low index cladding material for pump guiding can further be implemented. The combined core area of this fiber is around 13400 μm$^2$ and approximately 3 times larger than the largest possible core area of conventional large core fibers. The cladding/core area ratio is of the order of 6.4; therefore very high cladding absorption can be achieved in such a structure at low Yb doping levels, which greatly simplifies the manufacturing of this structure and increases the fiber life time.

An example of the cross section of a multi-core fiber with 19 individual single-mode cores based on leakage channel fibers is shown in FIG. 3*b*. Here the shaded circles represent the core areas, which are doped with Yb whereas the small non-shaded circles represent air-holes or glass areas with reduced refractive index. The design of each individual core with its corresponding leakage channels follows the design considerations as disclosed by Dong et al. in copending U.S. applications: Ser. No. 11/134,856, Ser. No. 60/975, 478, Ser. No. 61/086,433, and PCT international application no. PCT/US/74668, each entitled "Glass Large-Core Optical Fibers, and assigned to the assignee of the present invention. The disclosures of Ser. Nos. 11/134,856, 60/975,478, 61/086,433, and PCT/US/74668 are hereby incorporated by reference in their entirety.

The air hole size or the size of the area with reduced refractive index is chosen to provide acceptable loss for the fundamental mode while providing a high loss for higher order modes. In an exemplary embodiment, ytterbium-doped rods with a refractive index closely matched to that of fused silica glass are hexagonally stacked with a second type of rods, which may have the same diameter, so that each ytterbium-doped rod is surrounded by six rods of the second type. The ytterbium rod can have an ytterbium-doped center portion surrounded by fused silica glass. The second type of rods has a center portion with lower refractive index, e.g. fluorine-doped silica, further surrounded by fused silica glass. The ratio (ytterbium rod diameter)/(second rod type diameter) is typically between 0.6 and 0.9. The hexagonal stack is typically inserted into a silica glass tubing with an inner diameter slightly larger than that of the outer dimension of the hexagonal stack. In one embodiment, the resulting preform is drawn on a fiber drawing tower to an appropriate fiber diameter with the inside of the outer tube vacuumed. A lower index polymer coating can also be put on the fiber so that pump light can guide in the glass area of the fiber. In an alternative embodiment, a layer of capillaries are put between the stack and the silica tube so that the pump can guide inside the layer of air holes. In a further alternative embodiment, capillaries can be used in place of the second rod type with a fluorine-doped center portion. In another embodiment, boron-doped silica rods can be used in as illustrated in FIG. 3*c* to make each leakage channel fiber core birefringent for polarization-maintaining applications. Examples of such polarization maintaining, multicore, leakage channel configurations will be further illustrated below.

Figure 4:
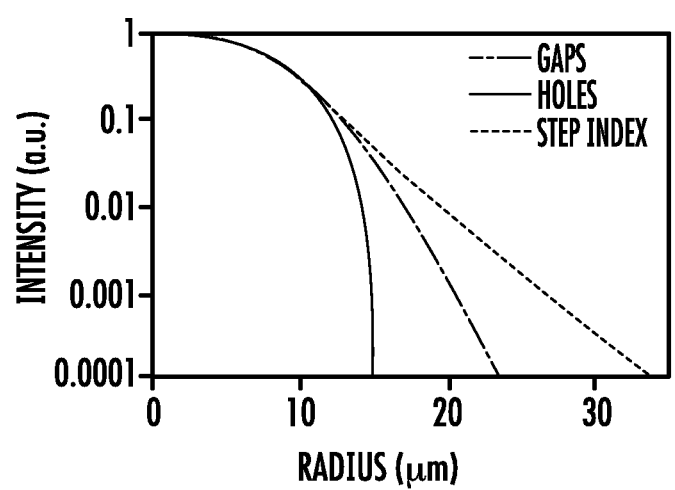
FIG. 4 is a plot illustrating the radial modal intensity distribution of a single-mode step index fiber (dotted line) and a typical leakage channel fiber (dashed line and dashed-dotted line); the dashed line corresponds to an intensity distribution along two low index capillaries, whereas the dashed-dotted line corresponds to an intensity distribution along two gaps.

The use of multicore leakage channel fibers allows tighter packing of the cores compared to conventional step-index multicore single-mode fibers with less mode-coupling because of the minimization of the modal wings of each individual mode. This is further illustrated in FIG. 4, where the modal intensity distribution of a conventional single-mode fiber is compared to the intensity distribution of a leakage channel fiber. Clearly the wings of the intensity distribution of the leakage channel fiber go down to zero much faster than in conventional step-index fibers.

In the example shown in FIGS. 3b and 3c there is one low index feature disposed between two adjacent rare-earth doped core regions. In order to further reduce mode-coupling, the core separation can be increased and more than one low index feature can be disposed between two doped core regions.

With leakage channel fibers, core diameter/core separation ratios ~0.5 can be achieved with minimal coupling between individual cores. When coherently adding all the emission patterns of such leakage channel based multicore fibers, Strehl ratios of the far field emission pattern >0.4 in a tiled aperture configuration can be achieved without the use of any coherent mode modifying elements such as phase plates. Here we recall that the Strehl ratio is the ratio of the far field intensity of a beam with a certain intensity and phase distribution within an aperture over the far field intensity of a hard aperture beam. Strehl ratios approaching unity can be obtained using filled aperture configurations as explained below. Even in filled aperture configurations tight packing of the individual cores in multi-core fibers is beneficial as it allows a minimization of the overall fiber diameter and improved heat dissipation compared to a fiber with a larger outer diameter.

Any tight packing of cores in a multicore structure leads to the formation of supermodes and mode-coupling between the cores. Inherent index fluctuations inside the multicore structure may be caused by various physical mechanisms, for example stress or built-in refractive index variations. As a result, supermodes can be greatly suppressed. The modes in the optical fiber can be represented as a simple linear combination of the individual core modes with negligible mode-coupling between them.

In order for mode-coupling to be negligible, energy coupling between fiber array elements less than about 1% is preferred, and more preferably smaller than 0.1%, or smaller than 0.02%. In one experiment by the inventors about 0.01% coupling was observed.

Supermode-suppression works most effectively for large core fibers, where the core diameter is >30 µm. In comparison to individual large core fibers, where refractive index fluctuations limit the achievable mode size, in multicore fibers refractive index fluctuations are indeed beneficial as they allow increased core stacking densities and larger effective mode areas compared to individual large core fibers.

Multicore fiber lasers can also be manufactured in an all polarization maintaining (PM) configuration. An exemplary design of a multicore PM fiber is shown in FIG. 3c. Here a leakage channel fiber is shown. The fiber is very similar to the structure shown in FIG. 3b, but for the additional incorporation of stress producing regions, which are represented by the small shaded areas disposed opposite each core in FIG. 3c. In this example the stress producing regions correspond to two of six features immediately surrounding each core. The regions produce stress in the fiber core and lead to polarization maintaining operation. PM single-core PM leakage channel fibers were discussed in Dong et al. in U.S. application Ser. No. 11/134,856; U.S. provisional application 60/975, 478; Ser. No. 61/086,433; and PCT international application no. PCT/US/74668, each entitled "Glass Large-Core Optical Fibers Multicore PM leakage channel fiber designs scale these polarization maintaining embodiments to multiple cores and are therefore not further discussed here.

Figure 5:
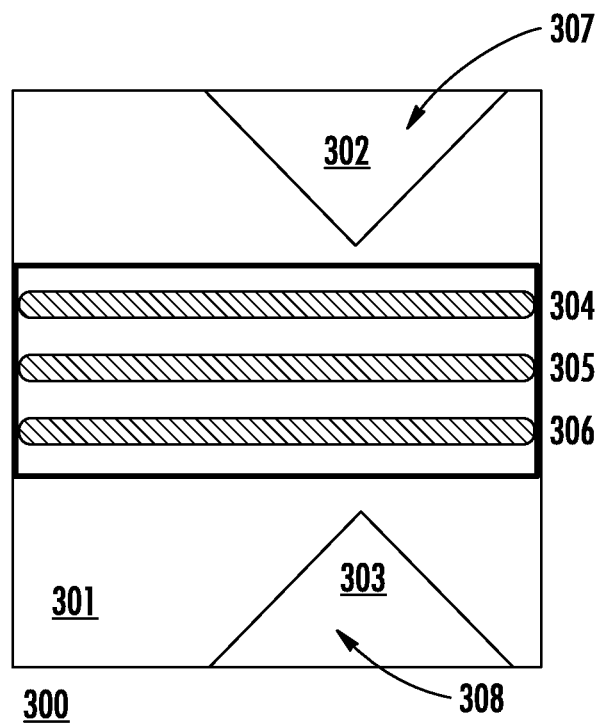
FIG. 5 is a plot of a side-pumping scheme for a multicore fiber.

Multicore fibers can also be side-pumped as shown in FIG. 5, which shown a side-pumping arrangement 300 for a multi-core fiber 301. Multicore fiber array 301 comprises a larger diameter solid-glass rod. V-grooves 302 and optionally 303 are then cut into the side of the multi-core fiber. The multi-core fiber comprises individual cores 304-306; only three cores are shown but larger numbers of cores are also possible. V-grooves 302 and 303 are used to direct pump light into the multi-core fiber structure, where the pump light is designated with the arrows 307 and 308. This pumping scheme is very similar to the those described for single core fibers in U.S. Pat. No. 5,854,865 entitled "Method for coupling light into cladding-pumped fiber sources using embedded mirrors", and U.S. Pat. No. 6,704,479 entitled "Method and apparatus for side pumping a fiber". These and various other pumping configurations are well known for single-core fiber pumping and therefore not further described here. FIG. 5 serves only as an example of a side-pumping scheme; in principle any side-pumping scheme as used in context with single-core double clad fibers can also be used.

For an Yb glass multi-core fiber with a length of 1 m, the thermal load for an output power of 1 kW is calculated as around 50-100 W, which in turn produces a temperature differential of around 10° C. between the central and peripheral core regions. The corresponding optical path length difference between the central and the peripheral cores is thus around 110 µm at full thermal load, corresponding to a time delay of 0.3 ps. For near bandwidth-limited ns length pulses this time delay does not need to be compensated as long as the coherence time is much greater than about 1 ps. For fs or strongly chirped ps and ns pulses, the thermally induced optical path length difference needs to be compensated. This can be achieved by the introduction of appropriate phase delays introduced before or after the fiber. Such phase delays can for example be implemented with optical phase plates of a certain thickness. For small heat loads an adaptive optics compensation scheme can adjust for the path length difference.

Figure 5A:
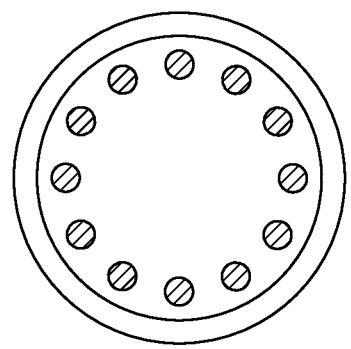
FIG. 5a schematically illustrates a coax multicore fiber.

Alternatively the cores can be located in a single ring at the periphery of the fiber as exemplified in FIG. 5a. In various embodiments all cores have approximately the same radial separation from the fiber center, and the thermally-induced optical path length differences between all cores is approximately equalized. In the following we refer to such a structure as a coax multicore fiber. Moreover, locating all cores on the periphery in a coax multicore fiber allows for more efficient cooling and operation of the coax multicore fiber at absorption levels beyond the stress fracture limit of a conventional glass rods. The reason is that the temperature increase in the center of a coax multicore fiber is significantly lower for the same heatload compared to a conventional glass rod for the same heat load per meter. To operate at very large levels of heat load it is therefore beneficial to confine the pump light also in a ring at the periphery of the fiber. This can for example be accomplished by using a low index material for the central fiber area, such a fluorine glass. Numerous variations of the coax multicore fiber are possible where the cores are disposed symmetrically about the fiber center. In some embodiments the fiber cores may be disposed at the vertices of a regular polygon, for example a polygon having 6, 8, 12, or more sides. Features may be disposed about each core and may comprise air holes or a low index glass. Polarization maintaining configurations similar to that of FIG. 3c. may be used in some embodiments.

Figure 6A:
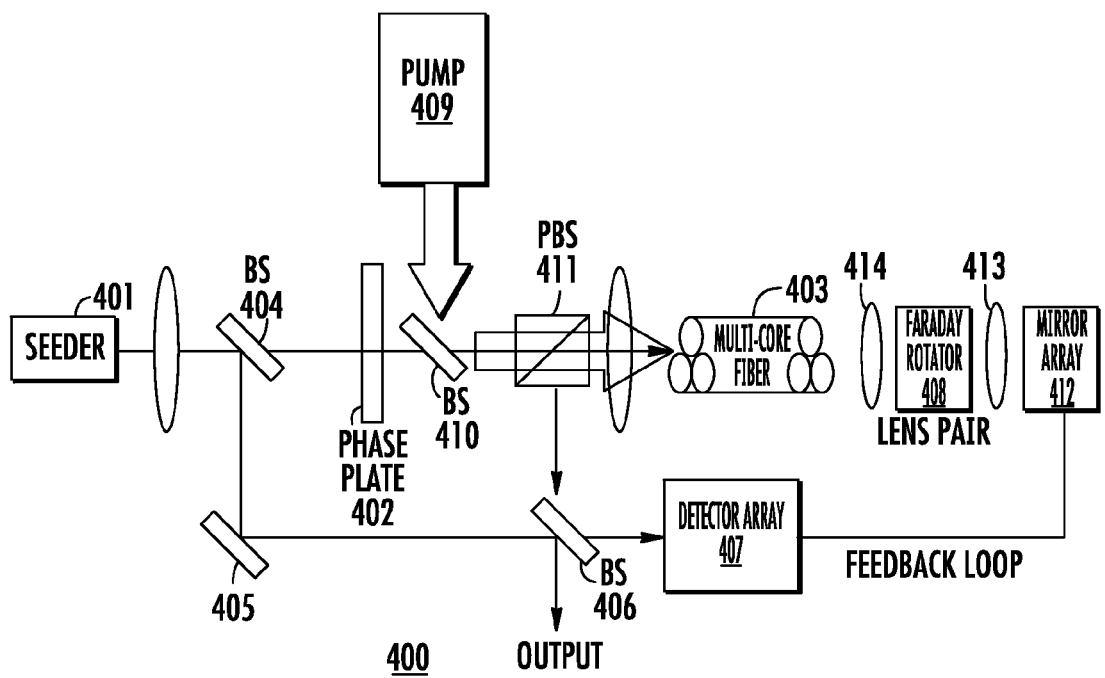
FIG. 6a is a diagram of a generic scheme for the coherent addition of the output from the individual fibers from a multicore fiber amplifier operated in reflection.

An exemplary implementation of a multicore fiber amplifier according to a fourth embodiment in a set-up 400 for simultaneous phase control in all individual cores is shown in FIG. 6a. Here a multicore fiber as shown in FIGS. 3a and 3b is used. In one basic implementation the front end of an optical near diffraction limited beam from a laser seeder 401 is imaged via a phase plate 402 (or diffractive optical element) onto the front facet of a multi-core fiber amplifier 403. The phase mask 402 is used to transfer the single beam pattern from the seed laser into a multi-beam pattern on the surface of the multicore fiber 403 and to concentrate the light from the front end system to the location of each individual core of the multi-core amplifier. In this example, a fraction of the seed light is directed with beam splitters (BS) 404, 406, and mirror 405 to a detector array 407 which is used for phase detection. In principle more than one seed laser with a corresponding multi-beam pattern can also be implemented. For stable operation of the beam transfer from seed to multi-core amplifier via a phase plate, any multiple seed beams need to be coherent. System implementation with multiple seed beams is a straightforward extension to FIG. 6a and are not further discussed here.

In order to avoid feedback from the multicore amplifier, an isolator (not shown) is typically inserted after the seeder 401. The seeder light 401 is amplified in each individual core of the multi-pass amplifier, where a double-pass configuration including a Faraday rotator mirror 408 is used to maximize the signal gain and to compensate for any polarization drifts inside the assembly.

In this example an end-pumped configuration is shown. The pump light from pump laser 409 is provided via a dichroic beamsplitter 410 and polarization beam splitter 411 inserted at the signal launch end. Here it is assumed that the pump and seed light have opposite polarization states. Appropriate optics upstream of the dichroic beamsplitter is further used to maximize the coupling efficiency of both the pump and signal beam. The pump is conveniently obtained from a beam-shaped semiconductor laser (see for example Fermann et al., U.S. Pat. No. 6,778,732 and references therein) and coupled into the pump cladding of the multicore fibers. Alternatively, side-pumping schemes as described with respect to FIG. 5 can be implemented which further simplifies the assembly. Equally the assembly can further be simplified when incorporating integrated components instead of bulk optics components in the present embodiment.

An adaptive mirror or an adaptive mirror array 412 is inserted after the first pass through the multicore fiber to modulate and control the slowly varying phase between individual fiber cores. The mirror array can for example be constructed from piezo-electric transducers as well as MEMs arrays. A lens pair 413, 414 is further implemented to image the output of the multi-core fiber 403 onto the mirror array 412. The output of the multi-core fiber rod 403 is directed via the polarization beam splitter 411 onto a second phase plate (not shown) similar to the first phase plate 402 for beam combination and then to the application. A small fraction of the output beam is directed via beam splitter 406 onto detector array 407. Phase information for the optical paths corresponding to each individual core within the multicore fiber is obtained by interfering a fraction of the seed signal with a fraction of the output from the multi-core fiber 403.

The signal from the seed laser may be dispersively stretched in time and an additional bulk dispersive pulse compression element may be included to further increase the peak power of the pulses.

Figure 7:
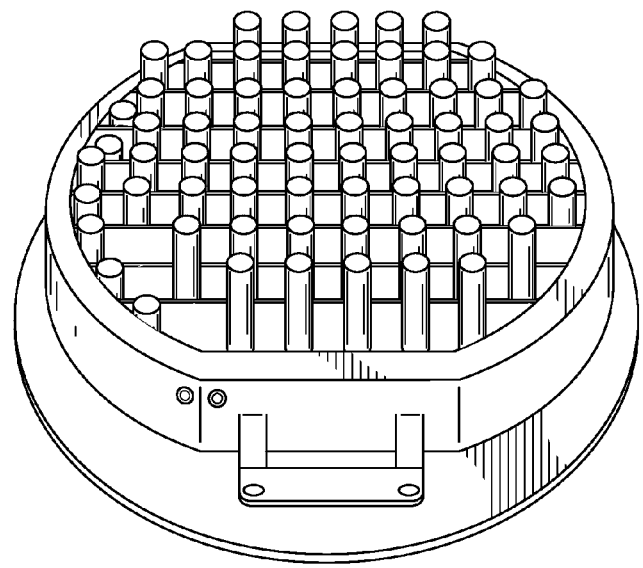
FIG. 7 is a schematic illustration of a commercially available mirror array.

An example of a commercial adaptive mirror array is shown in FIG. 7. For well designed mirror arrays, the location of each mirror can be adjusted at a frequency between 100-1000 Hz, which is sufficient to compensate for the slow phase fluctuations in the multi-core fiber array, which have the largest amplitudes in a bandwidth in the 1-100 Hz range, once the fiber is operated at constant temperature.

In various embodiments commercially available MEMs devices having an array of spatially separated mirrors may be utilized for phase control. Each element of the MEMs array may include a mirror controllable over a length of several microns along the optical axis (stroke length), and may provide for tip/tilt control. By way of example, the S37 series available from Iris AO, Inc. includes MEMs deformable mirrors, including with arrays having 37 elements, a maximum stroke of 12 µm, controllable up to about 2 KHz, with control software.

In various embodiments the required adaptive mirror electronic actuator control is performed using standard techniques as known from astronomy, i.e. a small dither signal is applied to each mirror and the phase of the optical signal path along that arm is measured using heterodyne detection at the dither frequency.

With this multi-core fiber array, the power limits of conventional single-mode fibers can be exceeded by a factor of 10-100, where the average power capability can be in the kW range.

Figure 6B:
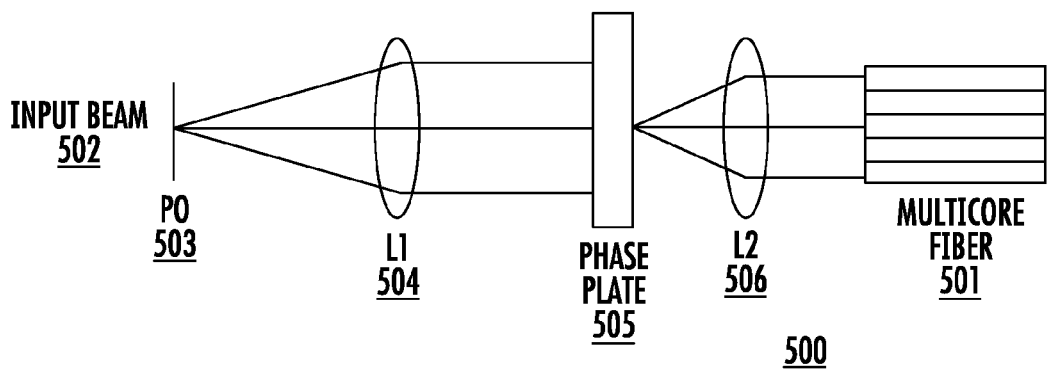
FIG. 6b is an exemplary schematic illustration for seed signal injection into a multicore fiber amplifier. The same scheme can also be used for signal extraction from a multicore fiber amplifier when coherently adding the individual cores in a filled aperture configuration.

A specific design example according to a fourth embodiment comprising an optical arrangement for coherent addition 500 is further discussed in FIG. 6b). For simplicity, we assume that the multi-core fiber 501 is side-pumped and polarization maintaining. The output from a single-mode fiber (not shown) is magnified with an appropriate telescope (also not shown) to produce an input beam 502 with a spot size diameter of 100 µm in a plane 503 located at point P0. The corresponding angular divergence is thus 0.73 degrees and the corresponding numerical aperture of the input beam is 0.0064 at a wavelength of 1 µm. A first lens L1 504 with a focal length of 100 mm is then used to collimate the beam from point P0. A phase plate 505 is positioned at a distance of 100 mm from lens 504 to split the input beam into a multitude of diffracted beams. The spot size on the phase plate is calculated from the divergence of the input beam as 1.3 mm. By selecting a modulation period of d=0.4 mm on the phase plate we obtain a diffraction angle of $\sin(\alpha)=1/400=0.0025$. By positioning the phase plate in the focus of a second lens L2 506 of focal length 40 mm, the single beam is transformed into an array of beams with spot diameter of 40 µm with a beam to beam separation of 100 µm.

An appropriate multi-core fiber 501 designed for receiving the input beam can be a loss channel fiber (e.g.: a leakage channel fiber or another multicore fiber of different design) with core diameters of 50 µm and a core to core separation of 100 µm. The same arrangement can also be operated in reverse to combine the output of a multi-core fiber into a single beam, where lens L1 504 can be omitted. Equally, the optical configuration shown in FIG. 6b operated in reverse can also be used for beam combination in a filled aperture configuration using only a single pass through the multicore fiber array 501. Techniques for controlling the phase of each individual core in single-pass configurations are discussed with respect to FIG. 8 below.

The multi-core fiber amplifier 501 can be isolated from a seed-beam by using an isolator upstream of point P0. Also when operated in a double-pass configuration, the output can be extracted by positioning of a Faraday rotator and a polarization beam splitter upstream of point P0. Such optical elements are well known in the state of the art and not further discussed here.

In the configuration shown in FIG. 6b the second distal end of the multi-core fiber is imaged onto a mirror array, for example the array shown in FIG. 7. Since the individual facets of mirror arrays are typically of the order of mm in diameter, appropriate magnifying optics can be implemented to increase the separation of the individual beam-lets from the multicore fiber on the mirror arrays. Optics for image magnification are well known in the state of the art and are not further discussed here.

Figure 8:
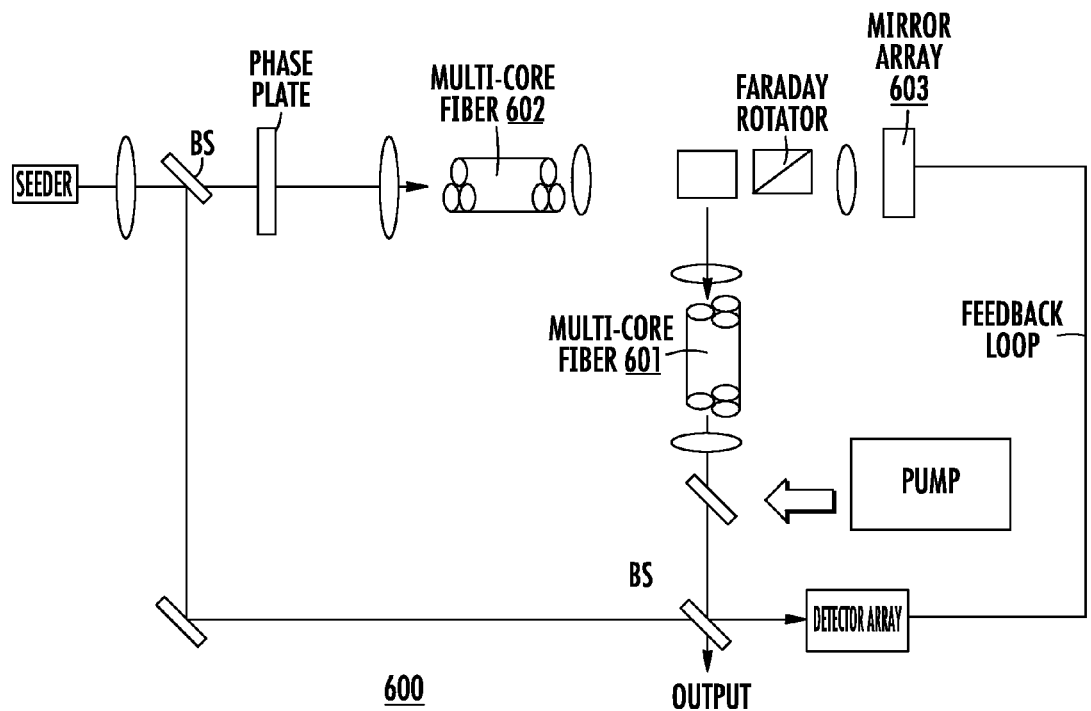
FIG. 8 is a diagram of a generic scheme for the coherent addition of the output from the individual fibers from a multicore fiber amplifier operated in transmission.
Figure 9:
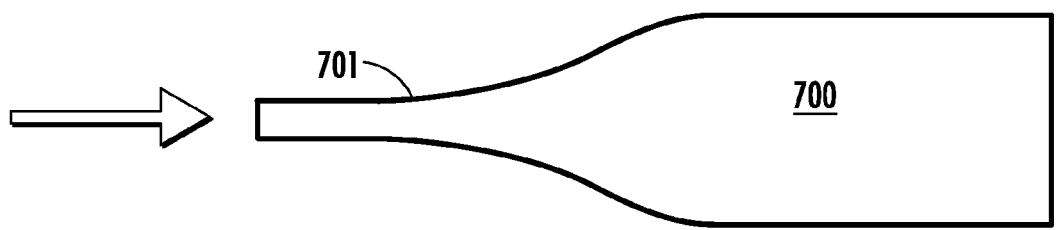
FIG. 9 is a diagram of a generic scheme for injection seeding of a multicore fiber using a taper at the signal launch end.

In a variation of the fourth embodiment, instead of a double-pass arrangement, single-pass arrangements can also be implemented. However, single pass arrangements are slightly more complex and do not automatically compensate for any polarization drifts inside the amplifier. For single-pass arrangements, therefore, it is convenient to use polarization maintaining multicore fiber arrays as shown in FIG. 3c. An exemplary single-pass arrangement 600 using a polarization maintaining multicore fiber 601 is shown in FIG. 8. Here a multicore fiber pre-amplifier 602, matched in dimensions to the final power amplifiers 601 is shown which is used to spatially precondition the signal beam for optimum coupling of the output from the mirror array to the final power amplifier. Again the use of side-pumping schemes further simplifies the optical assembly. The optical arrangement can further be simplified by substituting the pre-amplifier multicore fiber with a tapered multicore fiber with a single beam input as shown in FIG. 9. Here the multicore fiber 700 is tapered to a small diameter at the signal input end 701. Such a multicore fiber is equivalent to a star coupler, splitting an input signal approximately equally into all individual fiber cores in the expanded region of the fiber. An additional coupler upstream of the tapered fiber region can further be used to provide the reference signal for the detector array. Alternatively, the mirror array 603 in FIG. 8 can be supplemented or replaced with a spatial beam modulator operated in transmission. A spatial beam modulator, for example a spatial light modulator (SLM), can for example be inserted between the pre-amplifier 602 and the power amplifier 601. Such spatial light modulators are well known in the state of the art and are not further discussed here. The use of such spatial modulators greatly simplifies the assembly shown in FIG. 8. A phase plate (not shown) can be inserted at the output of the multi-core fiber amplifier for maximization of the Strehl ratio of the output beam.

The interference of the reference signal and the output of the multicore fiber 601 can further be used to provide feedback to the spatial light modulator to create the desired interference pattern that corresponds to all fiber cores being in phase. The desired interference pattern can be determined with a genetic algorithm. To obtain an appropriate cost function for feedback to the spatial light modulator the difference between the desired and actual interference pattern may be calculated.

For more rapid phase control digital holography techniques can be implemented. The principles of digital holography were discussed in U.S. Pat. No. 5,378,888 to Stappaerts et al. and in 'Coherent fiber combining by digital holography', C. Bellanger et al., Opt. Lett., vol. 33, no. 24, pp. 2937, December 2008. In order to implement digital holography for phase control a small test beam needs to be passed backward through the multicore fiber array and interfered with the reference beam on an additional detector array (not shown). This can be done by using appropriate arrangement of beam splitters, mirrors, and/or other optical elements for spatially dividing or directing beams. The main beam is configured to pass through the spatial light modulator as before. By feeding the interference pattern between the test and reference beam back to the spatial light modulator, the spatial light modulator can then be configured to generate the complex conjugate of the interference pattern when passing the main beam. Thus the phase fluctuations inside the multicore fiber array can be compensated. The test beam and the main beam will have similar wavelengths for the phase compensation technique to workbest. Preferably, the test beam has a small spectral bandwidth and has a wavelength centered within the spectral bandwidth of the main beam. Digital holography techniques are compatible with any of the fiber phased array configurations discussed here. Digital holography techniques are well known in the state of the art and are therefore not further discussed here. Because of the low frequency of phase fluctuations in multicore fiber arrays digital holography techniques are very efficient in compensating for phase fluctuations in such structures.

In a fifth embodiment, several additional schemes can be implemented for phase detection.

Figure 10A:
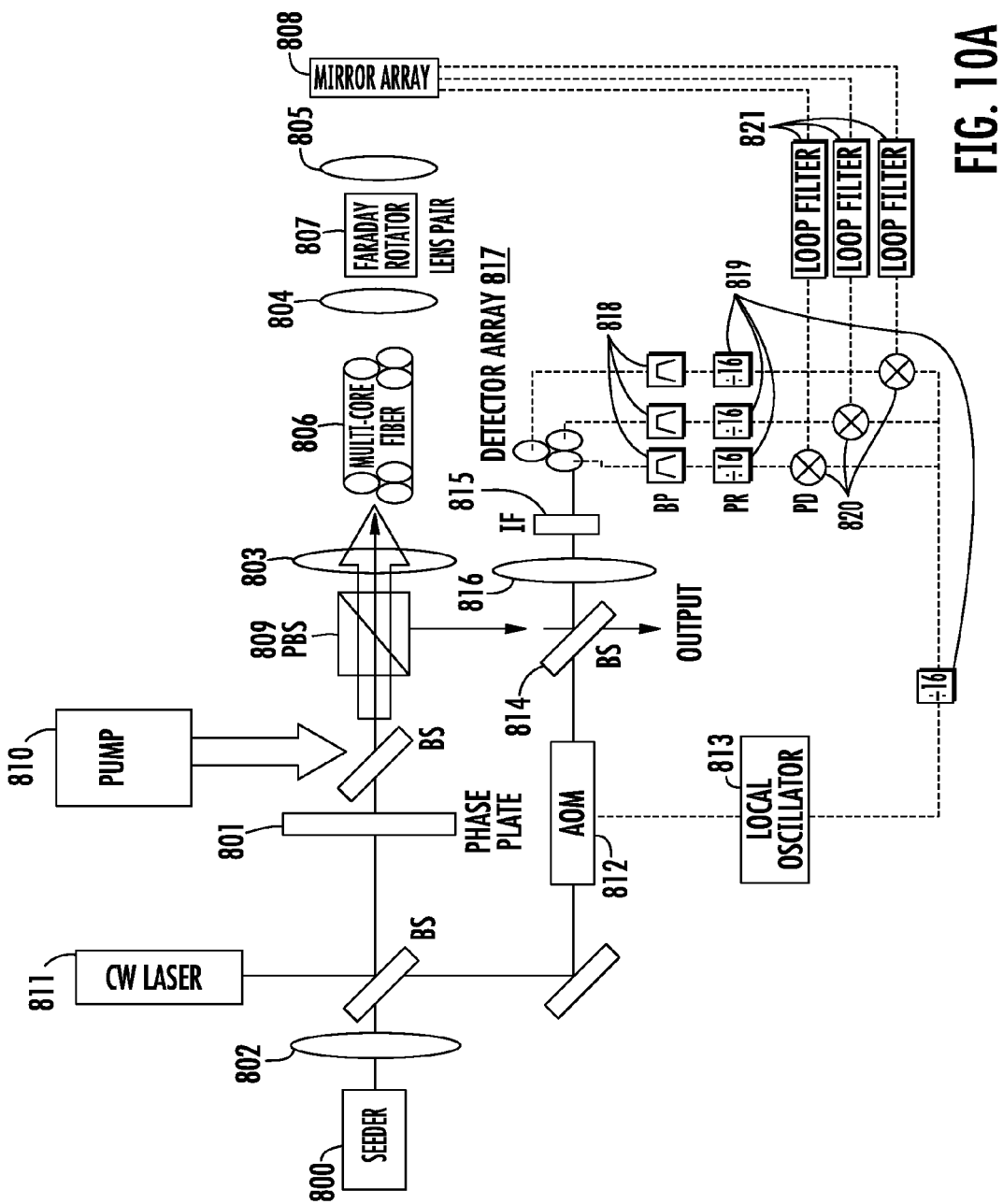
FIG. 10a is a diagram of a phase controlled multicore fiber amplifier using a cw laser for phase control.

A preferred embodiment is shown in FIG. 10a. A pulsed seed "signal" light source 800 is imaged onto the cores of a multi-core amplifier fiber 806 using a phase plate as a diffractive element 801 and relay lenses 802 and 803. At the fiber end facet the fiber cores are imaged on a segmented mirror array 808 using relay lenses 804 and 805 such that light emitted from a single core is reflected back into the same core by a single mirror segment. Each mirror segment can be translated by an actuator parallel to the light propagation direction. A Faraday rotator 807 is double passed to ensure environmental stability against polarization rotation in the amplifier fiber cores. After a second backward pass through the amplifier cores the light is separated from the launched light by the polarizing beam splitter 809. The multicore amplifier fiber 806 is cladding pumped by the pump source 810.

Light from a narrow linewidth continuous wave "stabilization" laser 811 is co-propagated through the individual doped fiber cores and used for phase detection. The wavelength of the light source is chosen to be of high transmission through the fibers. Preferably the wavelength of the cw light source is chosen to be different from the signal wavelength of the seed source 800 and to be outside the maximum gain band of the amplifier fiber cores. This ensures that little or no gain is obtained by the co-propagating cw light and the cw light does not significantly deplete the amplifier gain. Preferably the wavelength of the cw light source is chosen close enough to the signal wavelength to not suffer from chromatic aberrations of the relay lenses 803, 804 and 805 and such that the diffraction angle at the diffractive element 801 is close to that of the signal wavelength.

A portion of the cw light bypasses the active fibers and is used as reference beam. This part is frequency shifted by the frequency of a local oscillator 813 using an acousto-optic modulator (AOM) 812 and illuminates the elements of a photo-detector array. The cw-light co-propagating with the signal light is combined with the signal light at beam-splitter 814. A lens 816 together with lens 803 is used to image each fiber core onto a single photodiode of the photodiode array 817. If the wavelength of the cw laser is different from the seed laser an optical bandpass filter, for example interference filter (IF) 815 and a coating on beamsplitter 814 can be used to prevent light outside the wavelength of the cw laser from saturating the detectors.

At the detector array elements the reference light of a co-propagated cw light and the signal light interfere and a heterodyne beat signal is detected. Optional waveplates, diffractive elements and additional lenses in the reference beam can be inserted to maximize the beat signal. Any change in optical path-length of the active fiber cores leads to a Doppler shift of the co-propagating cw-light and therefore to a frequency shift of the beat signal. This beat signal can therefore be used to stabilize the optical path length of all fiber cores to a constant value. This method is commonly used for combining CW lasers and described for example in S. J. Augst et al.

Opt. Lett. 29, 474 (2004). In the embodiment described here the cw laser is however used for path length stabilization of the individual fiber cores and is different from the amplified light. This embodiment can be used for all repetition frequencies of the seed source. For path length stabilization the heterodyne signal is optionally filtered by the band pass filters 818. Phase-detectors (PD) 820 are used to detect the relative phase between the heterodyne beat signal and a reference oscillator. Those phase-detectors provide the error signal for the feedback stabilization loop which is closed by the loop filters 821 controlling the mirror actuators. Optional pre-scalers (PS) 819, for example a divide by 16 circuit, can be used to increase the locking range of the feedback loop.

The dynamics of the feedback loop are determined by the frequency response of the loop filters and the actuator element. The fastest response time of the loop-filter and actuators is on the 10 µs-timescale which is significantly longer than the seed pulse length. Therefore fast phase changes in the cw-laser which can for example occur due to cross phase modulation of the cw-laser with the amplified signal light is not interfering with the phase compensating feedback loop.

Figure 10B:
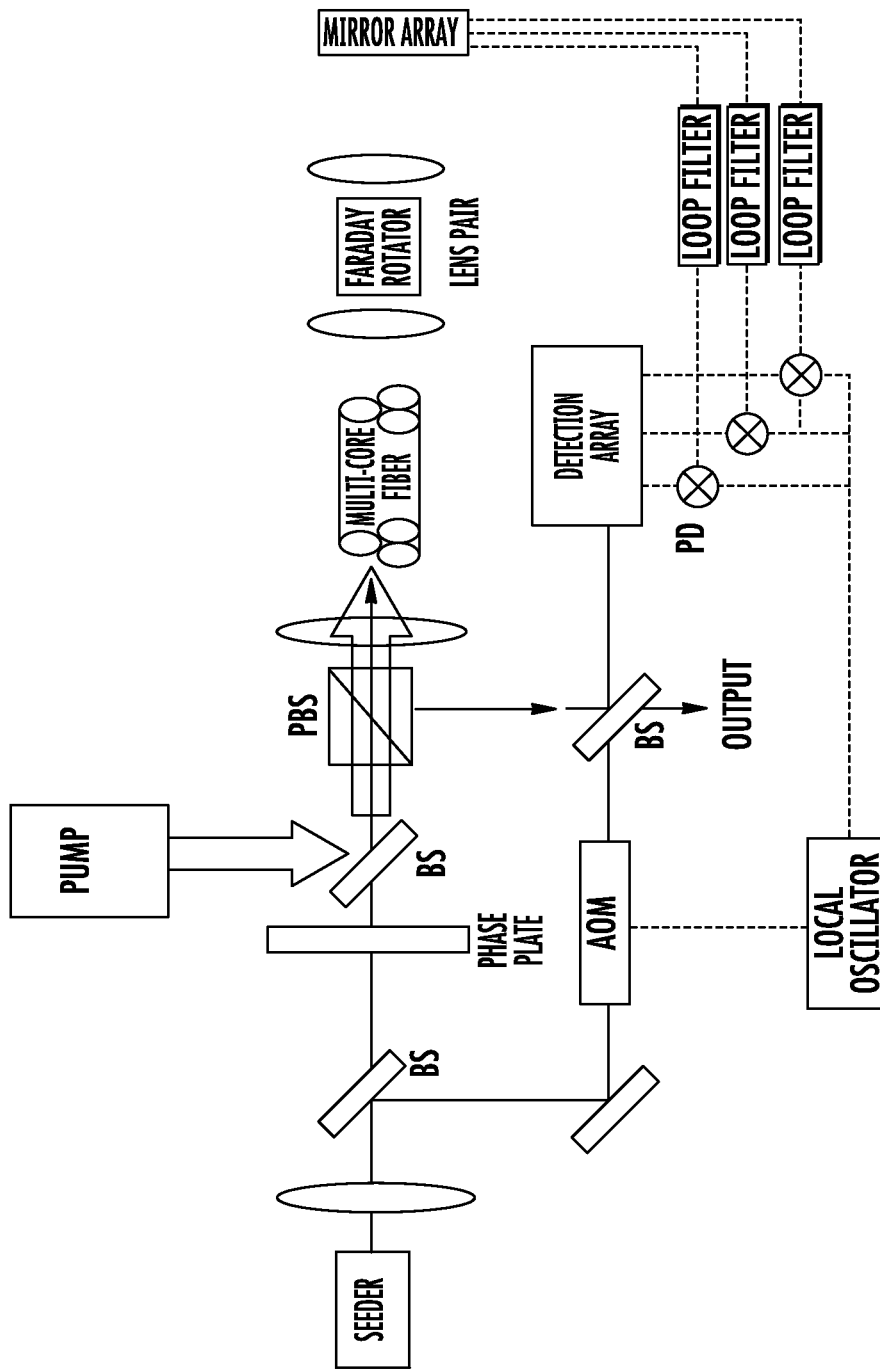
FIG. 10b is a diagram of a phase controlled multicore fiber amplifier using heterodyne phase detection by modulation of the reference beam.

In a second embodiment of phase detection the seed light itself can be used as reference as shown in FIG. 10*b*. Since the frequency of the local oscillator needs to be lower than the pulse repetition frequency but high enough to allow efficient heterodyne detection, this embodiment is preferably used for pulse-repetition frequencies above 1 MHz. For low frequencies the RF mixer based phase detectors can be replaced by analogue to digital converters (ADCs) and digital signal processing. In this case the frequency bandwidth of the feedback loop is preferably selected to be less than one tenth of the pulse repetition frequency.

Figure 11:
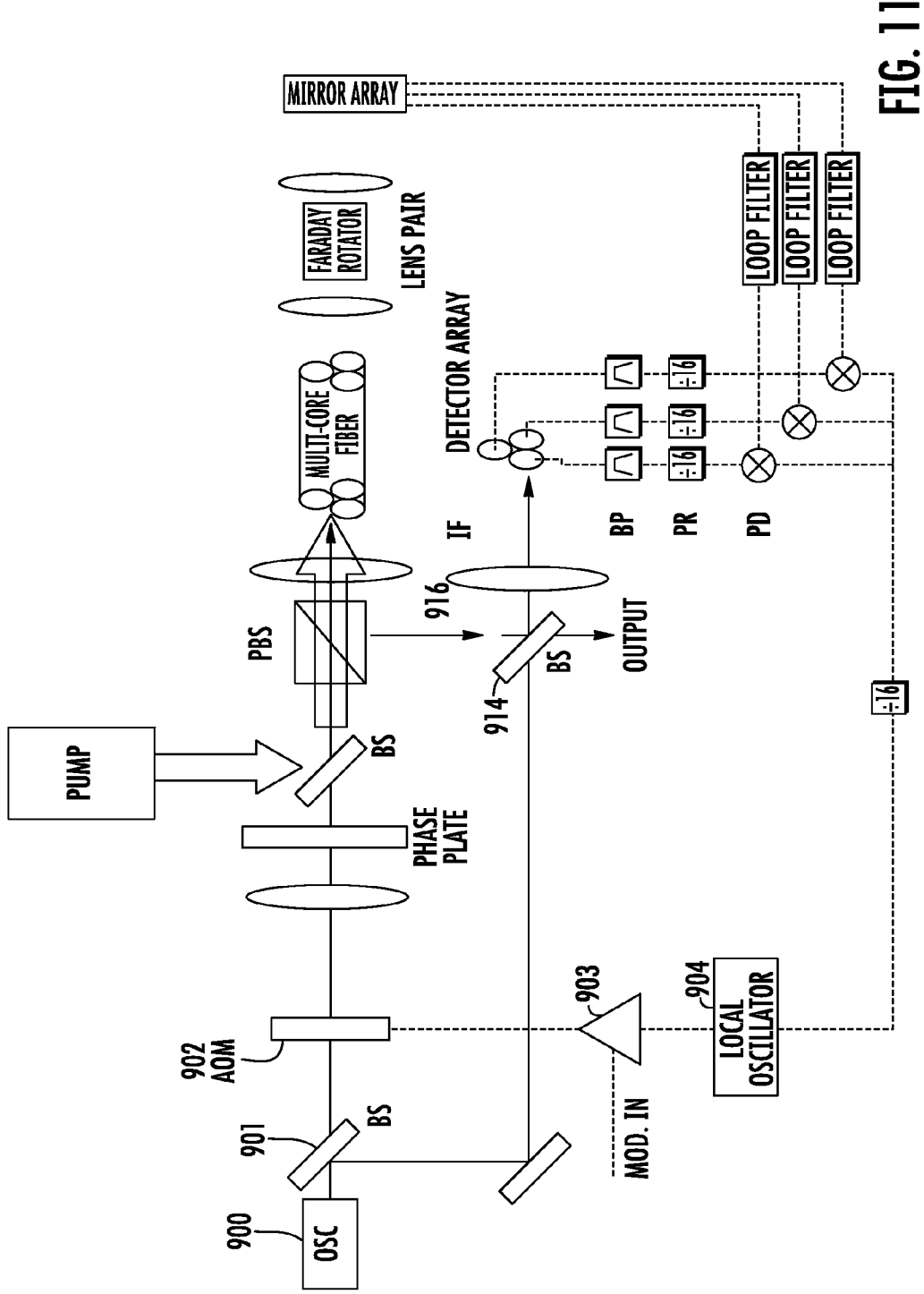
FIG. 11 is a diagram of a phase controlled multicore fiber amplifier using an acousto-optic modulator both for pulse modulation and phase control.

An alternative embodiment for phase detection at low repetition rates is shown in FIG. 11. Here a high repetition rate (>10 MHz) mode-locked oscillator 900 is used as seed source. An acousto-optical modulator 902 is used to modulate the intensity of the optical pulses from the seed-laser. This is done by applying an RF drive frequency to the modulator 902 and arranging the optical system to propagate the resulting $1^{st}$ order diffracted beam. The $0^{th}$ order non-diffracted beam (not shown) is blocked so as to prevent the energy from propagating through the optical system. These techniques are often used in the design of acousto optical modulator and deflector systems and not further discussed here. The RF driving field for the modulator is generated using the RF reference oscillator 904 and an RF amplifier 903 which has an input for amplitude modulation. The RF amplifier is now modulated in a way that high power RF pulses are generated at a significantly lower repetition rate than the mode-locked optical oscillator but synchronized with every $n^{th}$ oscillator pulse and at other times the RF power is significantly lower but not zero. In this way the optical pulse train is modulated in a way that every nth pulse is of high intensity and other pulses are of significantly lower but non-zero intensity. This enables use of the frequency shifted, diffracted pulse-train at the oscillator repetition rate for heterodyne beat detection with part of the oscillator light sampled by beam splitter 901. The two intensities are chosen in a way that the stored amplifier energy is mainly depleted by the high intensity seed pulses and the intensity contrast between high and low intensity pulses at the amplifier output is significant. To prevent saturation of the phase-detection electronics by the high intensity optical pulses, limiter circuits or fast electronic switches can be implemented. In this case the frequency bandwidth of the feedback loop is preferably selected to be ten times higher than the pulse repetition frequency.

Figure 10C:
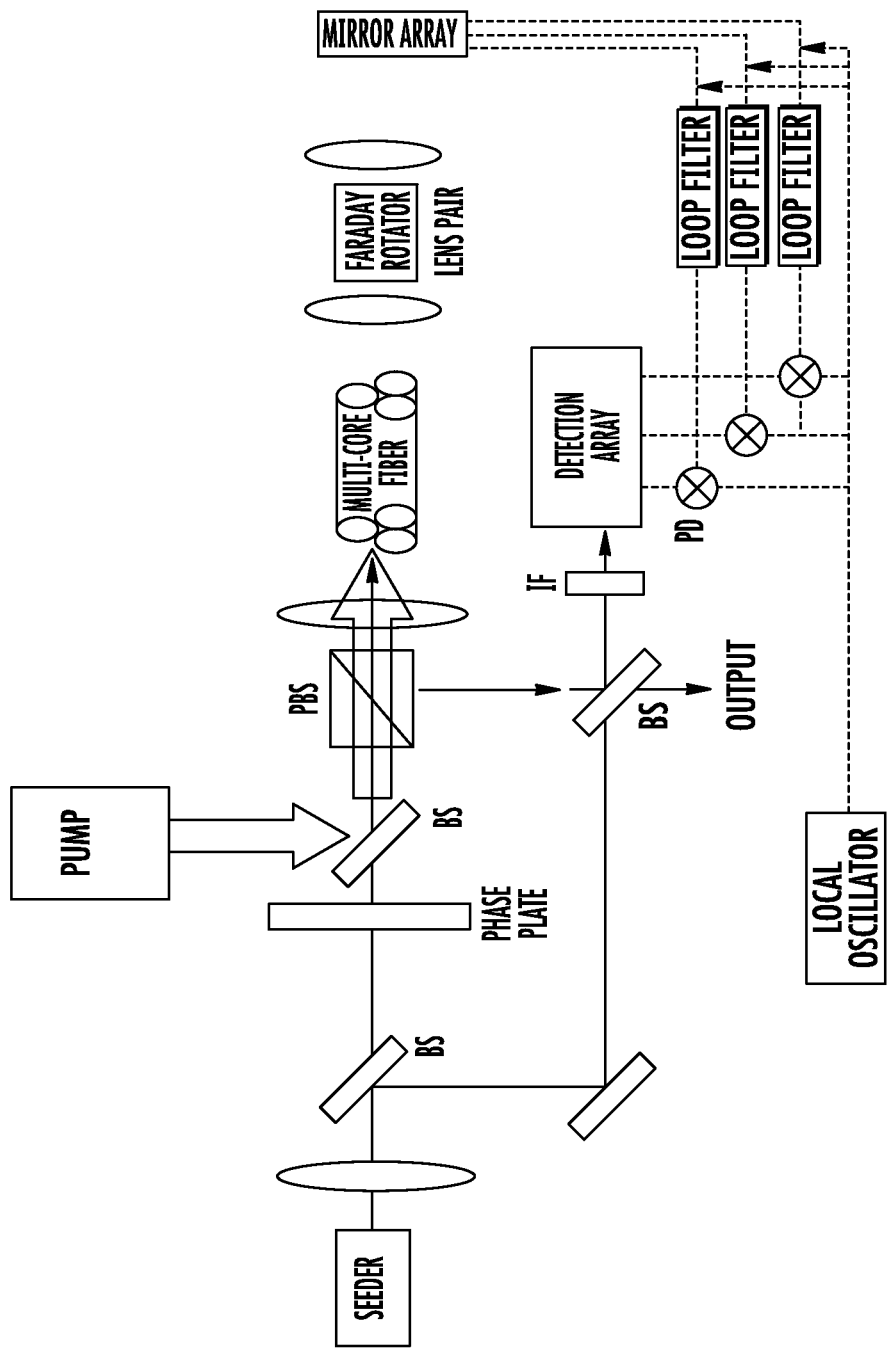
FIG. 10c is a diagram of a phase controlled multicore fiber amplifier using heterodyne phase detection by modulation of the beam path of each individual core.

In a third embodiment of phase detection shown in FIG. 10*c* a small modulation or dither signal derived from the local oscillator is applied to each element of the mirror actuator array. The signals from the detector array are phase sensitively detected. After low pass filtering the phase error is combined with the small modulation signal and used as feedback signal to the actuator array. The cut-off frequency of the low pass filter is lower than the dither frequency.

Figure 10D:
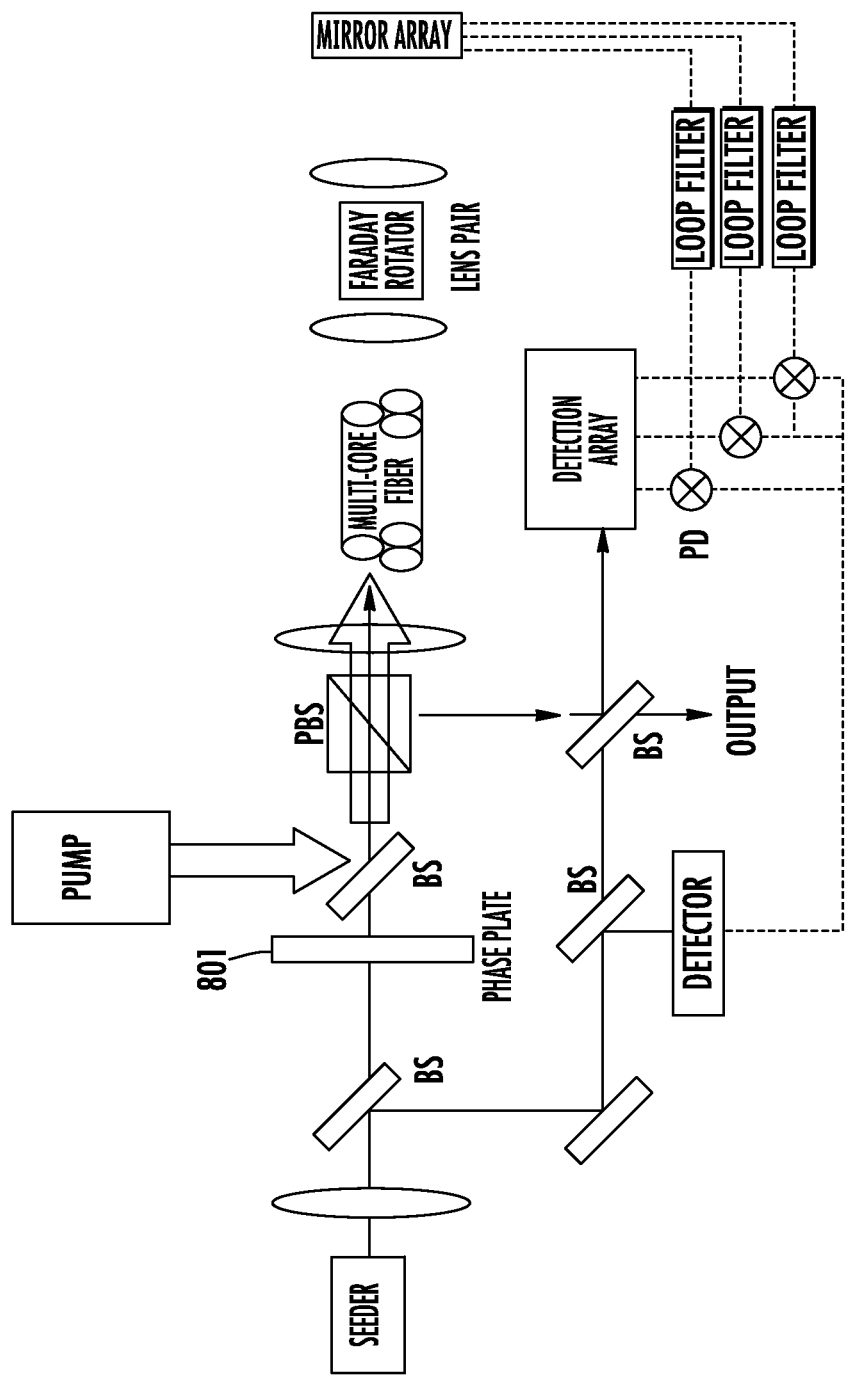
FIG. 10d is a diagram of a phase controlled multicore fiber amplifier using frequency combs.

In a fourth embodiment of phase detection shown in FIG. 10*d* the reference beam is not shifted in wavelength and the pulse repetition frequency of the seed is used as local oscillator. This approach utilizes the frequency comb structure of the seed laser and is described in detail in Yi-Fei Chen et al. "Remote distribution of a mode-locked pulse train with sub 40-as jitter". The work described by Chen et al. however stabilizes only the path length of a single optical fiber without gain. In the embodiment in FIG. 10*d* multiple fibers are stabilized to equal path length and optical gain is present.

Figure 10E:
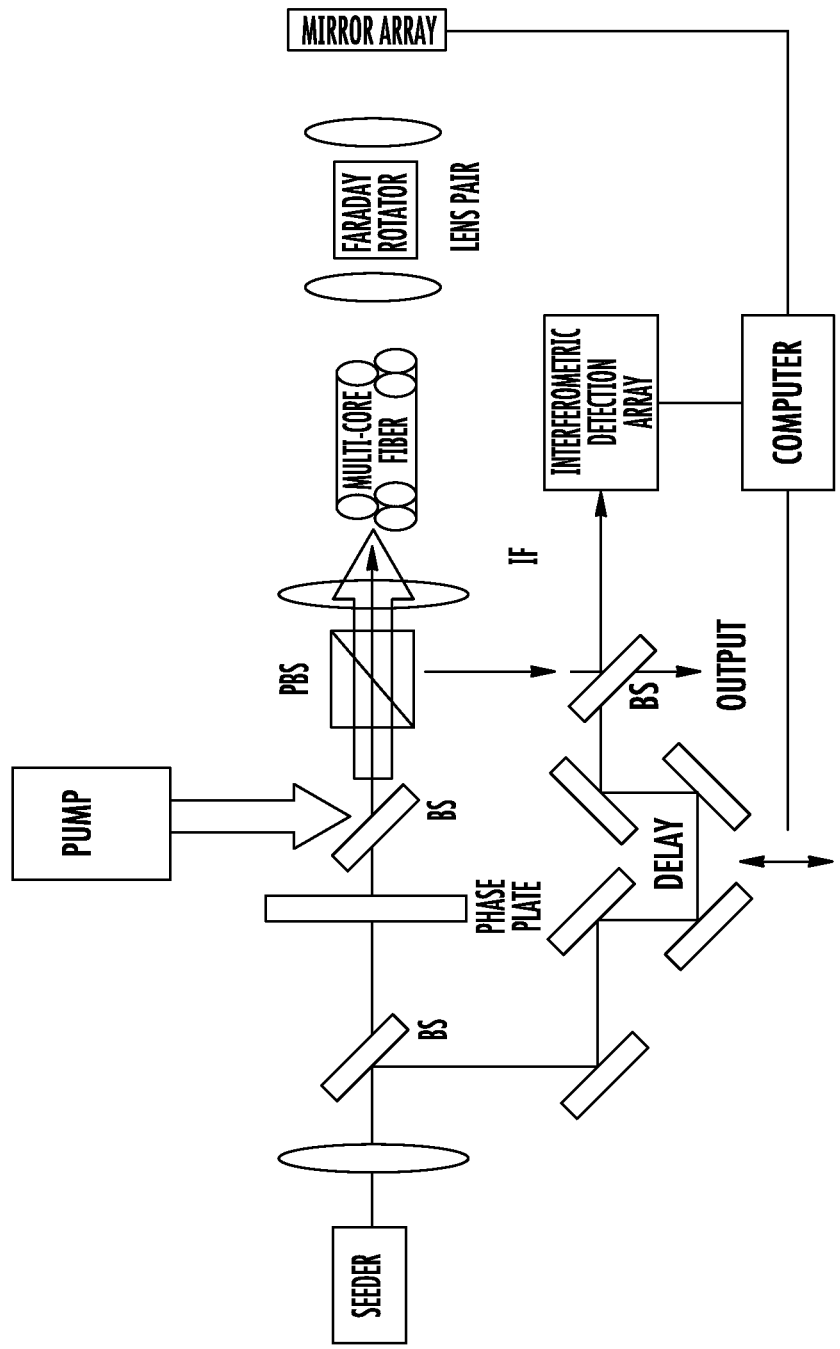
FIG. 10e is a diagram of a phase controlled multicore fiber amplifier using an array of interferometric cross correlators.

In a fifth embodiment of phase detection shown in FIG. 10*e* the detector array is replaced by an array of interferometric cross-correlators. The fringe pattern of the interferometric signal is detected and software-based low bandwidth feedback stabilization is implemented. In a modification of this embodiment the signal from one active core is used as a reference beam.

Numerous combinations are variations of the above example embodiments are possible.

As an alternative to the fringe pattern generated by interferometric cross-correlators, also the fringe pattern from spectral interference between the amplified signal pulses and a reference beam can be used for feedback stabilization.

In some embodiments, instead of heterodyne detection techniques for phase control, genetic adaptive optic algorithms can also be implemented for a minimization of the wavefront errors from multicore fiber arrays. Because genetic algorithms are typically much slower than heterodyne detection, these algorithms may be suited for use with strongly thermally coupled multicore fibers. In some embodiments, optimized algorithms and special purpose hardware may provide an increased control bandwidth for systems based on genetic algorithms. The use of genetic algorithms eliminates the need for interferometric detection of the phase fronts and a reference arm. A multicore fiber amplifier based on the use of a genetic algorithm for phase control is therefore constructed very similarly to the design shown in FIG. 6*a*, where the reference arm is eliminated. To obtain an appropriate cost function for feedback to the mirror array a frequency doubling stage for a fraction of the output beam is implemented. The frequency doubled power can then be measured with a single detector and optimized by appropriate adiabatic adjustment of the mirror array. Alternatively, a detector array can be implemented, which samples the frequency doubled beam at several locations; an appropriate cost function then maximizes the power in the central beam part and minimizes the power in the peripheral parts of the beam. Clearly a side-coupled multicore amplifier with adaptive modal control based on a genetic algorithm is highly compact and does not require many components, which is ideal for commercial systems.

Instead of multi-core fibers, more conventional fiber phased arrays can also be used for coherent addition. Such arrangements are well known in the state of the art and a system implementations to be used with optical signals was discussed in U.S. patent application Ser. No. 11/546,998 and is not further described here. Conventional fiber arrays can use separate pump diodes for each array element, which increases the noise bandwidth of the phase fluctuations.

Therefore, it is beneficial to use acousto-optic phase modulators for each array element also. Because of the phase noise bandwidth of 10-100 kHz in this case, the pulse repetition rate has to be in the range of 100 kHz to 1 MHz in order to allow phase control without a separate cw control laser. For lower repetition rate signals the leakage between a pulse modulator as discussed above with respect to FIG. 10b can be used for phase modulation.

Also for pulse repetition rates below 100 kHz, a cw reference signal can be used to allow an adequate bandwidth for phase control, as already explained with respect to FIG. 10a. Such cw lasers are selected at a wavelength of high transmission through the amplifier fibers (i.e. 1300 nm for Yb amplifiers) and can be coupled into each array element to equalize the phase of each array arm. However, cw lasers increase the complexity of the system.

Figure 12A:
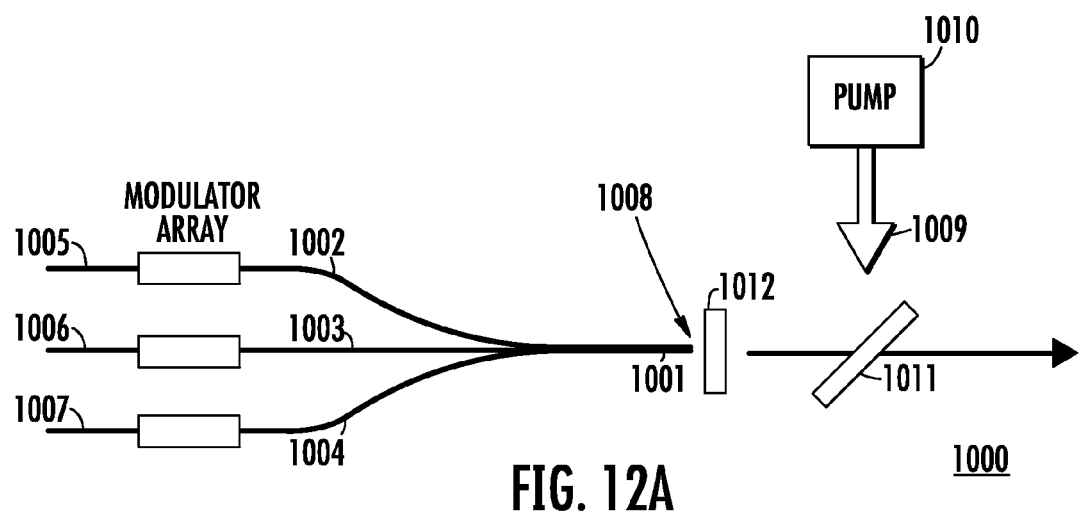
FIG. 12a is a diagram of a pump coupling scheme for a multicore fiber array.
Figure 12B:
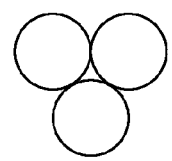
FIG. 12b is a diagram of geometric bundling of individual fibers of a fiber array.

Coherent addition at pulse repetition rates >1 MHz becomes progressively simpler because of the ability to control phase fluctuations with an increased bandwidth without the use of leakage signals. When using modulator arrays for phase control of individual beam paths in coherent addition, a reduction of the component count can be accomplished by using one pump beam. Such an exemplary embodiment is shown in FIGS. 12a and 12b. FIG. 12a shows an assembly 1000 for coherent addition of fiber amplifiers when using one pump beam. Here a multicore fiber 1001 is assembled from an array of individual fibers 1002, 1003, 1004 which are loosely fused at their boundaries. The cross section of such a loosely fused fiber array is shown in FIG. 12b. Because the fibers are loosely fused, they can be split into individual fibers at the signal injection end allowing coupling of individual signal beams 1005, 1006, 1007 into each fiber, as shown in FIG. 12a. At the pump coupling end 1008, the fiber ends can be fused further to allow efficient coupling of a pump beam 1009 from pump 1010 into the fiber array 1001 via beam splitter 1011 and lens 1012.

The Strehl ratio of the output beam can again be maximized by the use of phase plates in a filled aperture configuration as discussed with respect to FIGS. 6a and 6b.

The above embodiments were shown based on mainly transmissive optics, such as lens and transmissive phase plates. Various embodiments described herein are directed to the design of high power laser systems, including both high peak and average powers. At power levels above 100 W, thermal management can benefit greatly from the use of reflective optics such as mirrors and diffractive elements operated in reflection. The replacement of lenses with mirrors and the replacement of transmissive diffractive elements with reflective diffractive elements is straight-forward and not further discussed here.

The pulsed, coherently combined fiber laser sources as described here are ideal as pump sources for optical parametric amplifiers as well as for high power EUV, X-ray and plasma generation. For EUV and X-ray generation typically laser induced plasmas are used, where the plasma is generated by directing the coherently combined pulses onto solid or liquid metal targets. The increased peak power of coherently combined pulsed fiber laser sources greatly improves the conversion efficiency of EUV and X-ray generation compared to single-core fibers. High power EUV and X-rays sources are of great interest in advanced lithography applications and high resolution imaging and will benefit greatly from the implementation of compact high power coherently combined fiber based sources as discussed here.

Compact high power parametric amplifiers were discussed in U.S. patent application Ser. No. 11/091,015 and are not further discussed here. An implementation with a multicore fiber amplifier as parametric pump sources is very attractive, since they increase the obtainable pulse energy from such systems compared to pumping with single-core fiber amplifiers.

Figure 13:
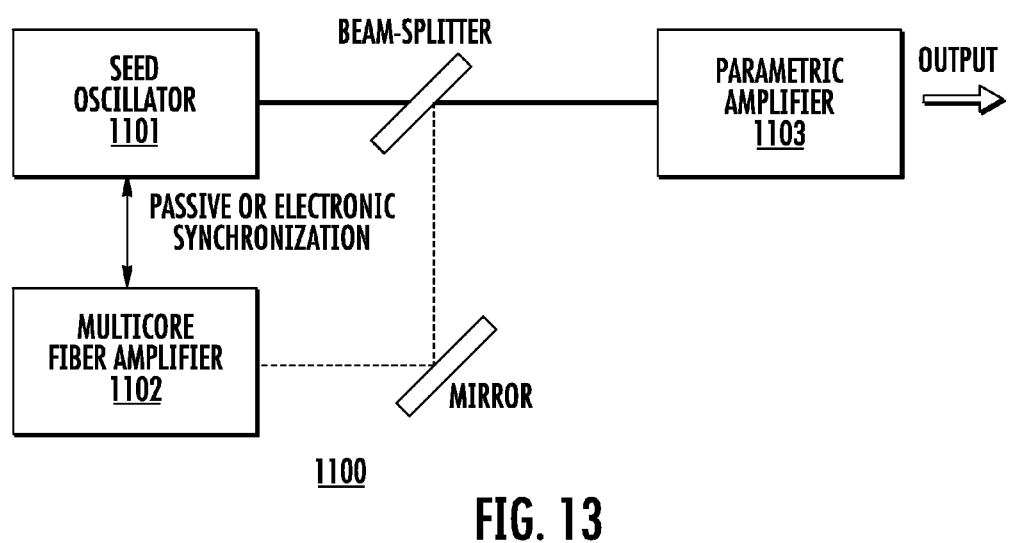
FIG. 13 is a diagram of a parametric amplifier according to an another embodiment.

An example of a parametric amplifier pumped with a coherently combined fiber laser 1100 is shown in FIG. 13 according to a sixth embodiment. Here a single-seed oscillator 1101 can be used for convenience. The seed oscillator is Yb based and seeds the multicore fiber amplifier 1102 to generated pump pulses with an energy in the range from 10-1000 mJ. The seed oscillator can be conveniently frequency shifted via passive frequency conversion elements as discussed in '015 to seed the parametric amplifier crystal 1103. By temporally overlapping both the parametric seed signal and the output from the multicore fiber amplifier, efficient amplification in the parametric amplifier crystal can be obtained. The B integral in the multicore fiber amplifier can further be minimized by the implementation of chirped pulse amplification schemes. In order to implement chirped pulse amplification, a pulse stretcher stage is implemented after the seed oscillator and before signal injection into the multi-core (or multi-element) fiber amplifier. After coherent combination of the individual beamlets of the multi-core (or multi-element) fiber amplifier, a pulse compressor stage is implemented. Such pulse compressor stages are for example conveniently based on bulk diffraction gratings. After pulse compression, the pump pulses are further directed to the parametric amplifier, where they are used to amplify the seed signal. With multi-core (or multi-element) fiber amplifiers high average power parametric amplifiers generating pulse energies in excess of 10 mJ can be generated.

Thus the inventors have described high peak power fiber amplifier systems having at least one array of fiber amplifiers, and particularly adapted for coherent combination of laser pulses. The amplifier systems are applicable in high peak power, short pulse applications. For example, peak power on the order of at least 1 MW may be generated. The systems may be used for EUV or x-ray generation, optical lithography, laser radar, or similar applications.

At least one embodiment includes a high-peak power fiber amplifier system. The system includes an array of fiber amplifiers. The amplifiers of the array are disposed in such a way that thermal fluctuations of the amplifiers are sufficiently matched and limit relative phase fluctuations at amplifier outputs to a low-bandwidth, for example to less than about 10 KHz. The amplifiers are disposed at sufficient relative distance such that energy coupling between any amplifiers is negligible. The system includes a means for seeding the array of amplifiers, including a laser source. The seed pulse and/or amplified pulses include pulse widths in the range of femtoseconds to about 1 microsecond. A beam distributor is disposed between the laser source and the array to distribute a pulse from the source, or to distribute a pulse from a means for seeding. The pulse is distributed into a plurality of beam paths incident on corresponding amplifiers of the array. The beams have a spatial distribution substantially similar to the spatial distribution of the pulse. At least one pump source is included for optically pumping the fiber amplifier array. A plurality of phase-control elements arranged in a spatial relation are optically connected to fiber amplifiers of the array. The phase-control elements modify an optical phase of at least one fiber amplifier output in response to a phase-control signal. The system also includes a means for producing a plurality of control signals applied to the phase control elements so as to control the optical phase at the output of the majority of the fiber amplifiers. The control signal and phase-control elements are configured to stabilize the optical phase between the majority of the individual fiber amplifiers of the array.

At least one embodiment includes a high peak power fiber amplifier system comprising an array of fiber amplifiers. The array is configured in such a way that a spatial separation of the cores of said amplifiers is sufficiently small to provide strong thermal coupling that limits output phase fluctuations of the array to a low bandwidth, for example less than about 10 Khz. A sufficiently large spatial separation between fiber amplifiers also limits optical energy coupling between amplifiers of the array, for example to about 0.1% or less. A plurality of phase-control elements are arranged in a spatial relation and optically connected to fiber amplifiers of the array. The phase-control elements modify an optical phase of at least one fiber amplifier output in response to a phase control signal. The system also includes a phase controller generating the phase control signals, and is operable to stabilize the optical phase at the output of amplifiers of the array.

At least one embodiment includes an amplifier system for coherent combination of laser pulses. The embodiment includes an array of fiber amplifiers, for example a plurality of individual fiber amplifiers, and at least one pump source configured to optically pump the fiber amplifier array. A pulsed master oscillator seeds the fiber amplifier array A plurality of phase-control elements arranged in a spatial relation are optically connected to fiber amplifiers of the array. The phase-control elements modify an optical phase of at least one fiber amplifier output in response to a phase-control signal. A means for producing a plurality of control signals applied to the phase control elements controls the optical phase at the output of the majority of the fiber amplifiers. The control signal and the phase-control elements stabilize the optical phase between the majority of individual fiber amplifiers.

At least one embodiment includes an amplifier system for coherent combination of laser pulses, for example sub-nano-second pulses. The embodiment includes an array of fiber amplifiers, for example a plurality of individual fiber amplifiers, and at least one pump source configured to optically pump the fiber amplifier array. A pulsed master oscillator seeds the fiber amplifier array. A fraction of the output of the master oscillator is used in a reference arm, and configured to optically interfere with a fraction of the output from the fiber array. Optical interference is detected with a detector array. The reference arm is further phase modulated to allow for heterodyne phase detection of the optical phase of the majority of the elements of the fiber array with the detector array. A plurality of phase-control elements arranged in a spatial relation are optically connected to fiber amplifiers of the array. The phase-control elements modify an optical phase of at least one fiber amplifier output in response to a phase-control signal. A heterodyne phase detector and the phase control elements stabilize the optical output phase between the majority of the individual elements of the fiber array.

At least one embodiment includes an amplifier system for coherent combination of laser pulses, for example sub-nano-second pulses. The embodiment includes an array of fiber amplifiers, for example a plurality of individual fiber amplifiers, and at least one pump source configured to optically pump the fiber amplifier array. A pulsed master oscillator seeds the fiber amplifier array. A fraction of the output of the master oscillator is used in a reference arm, and configured to optically interfere with a fraction of the output from the fiber array. Optical interference is detected with a detector array. The optical phase of the elements of a fiber amplifier array are dithered at a frequency derived from a local oscillator, allowing for heterodyne phase detection of the optical phase of the majority of the elements of the fiber array with the detector array. The heterodyne phase detector is configured to stabilize the optical output phase between the majority of the individual elements of the fiber array.

In various embodiments:
- amplifiers may be arranged such that thermal fluctuations in the indices of refraction of the gain media of the amplifiers are sufficiently matched so that relative phase fluctuations at amplifier outputs are limited to the low-bandwidth, for example less than about 10 KHz.
- a control signal and a phase modulator may be configured for maximizing the Strehl ratio of an output of a fiber array.
- a pulse repetition rate may be greater than about 100 kHz.
- control signals may be applied at a rate less than approximately 1/10th of a pulse repetition rate.
- a pulse repetition rate may be less than about 100 kHz.
- control signals may be generated from a leakage signal, for example between pulses in individual fibers of the array.
- an amplifier array may include a multicore fiber amplifier.
- an amplifier array may include multiple multicore fiber amplifiers.
- a multicore fiber amplifier may include individual elements constructed from step-index fiber, leakage channel fiber, photonic crystal fiber or Bragg fibers.
- individual fiber amplifiers may be polarization maintaining.
- a phase plate may be inserted between the master oscillator and a fiber amplifier array, so as to maximize coupling efficiency of the master oscillator into each amplifier of the fiber amplifier array.
- a phase plate inserted downstream of an output of a amplifier array may be included so as to maximize the Strehl ratio of the output of the fiber
- the system may include a means for side-pumping of the amplifier arrays.
- an amplifier may be constructed in a double pass configuration, and may include a Faraday rotator inserted after the first pass.
- an amplifier may be constructed in a single pass configuration.
- phase control elements may be formed as an integrated array of elements, for example as a MEMs or SLM.
- phase-control elements may include portions of a mirror array.
- phase-control elements may include portions of a MEMs array.
- phase-control elements may include portions of a liquid crystal spatial beam modulator.
- a phased pre-amplifier array may be included and matched in optical dimensions to the amplifier array.
- a pre-amplifier array may be tapered at its input end to simplify coupling of the master oscillator to the pre-amplifier array.
- a fiber amplifier array may be spatially separated into individual elements at its input and in optical contact at its output end, so as to simplify coupling of the master oscillator into the amplifier array.
- a fiber amplifier array may be optically pumped with a single pump source injected at the optical contact end of the amplifier array.
- a system may include a signal reference arm, and the reference arm arranged to interfere with a fraction of an output beam of the fiber array so as to facilitate detection of the optical phase of each individual fiber amplifier output.

a fixed dither frequency may be used to control a plurality of phase-control elements, for example phase modulators.

various dither frequencies may be used to control to a plurality of phase-control elements.

the phase of a reference arm may be modulated at a fixed frequency.

the system may include one or more detectors, for example a detector array.

the system may include a cw laser coupled and transmitted through each individual fiber amplifier of the array, and configured for heterodyne phase detection and stabilization of the optical phase of each of the fiber amplifiers of the array.

a control signal may be derived from a genetic algorithm designed to maximize the Strehl ratio of an output of the fiber array.

a fiber amplifier array may be used for EUV or X-ray generation.

a fiber amplifier array may be used as a light source in optical lithography.

a fiber amplifier array may be used as a pump source for parametric amplification.

a laser source may include a mode-locked oscillator.

the system may include a pulse stretching stage after the oscillator, and a pulse compressor stage inserted downstream from an array of fiber amplifiers.

a heterodyne phase detector and a plurality of phase-control elements may be configured for maximizing the Strehl ratio of an output of the fiber array.

a reference arm may be derived from an individual element of a fiber array.

an array of modulators may be configured for modulating the optical phase of the individual amplifiers at different frequencies.

a heterodyne phase detector may be configured to maximize the Strehl ratio of the output of the fiber array.

a spatial distribution of one or more pulses may be nearly diffraction limited.

optical energy coupling between fiber array elements may be less than about 1%.

relative fluctuations of array elements may be limited to less than about 1 KHz.

a means for producing a plurality of control signals may include a detector array and an adaptive algorithm for processing phase information obtained from a detector.

an adaptive algorithm may include a genetic algorithm.

a means for seeding may include a mode-locked fiber oscillator.

a means for seeding may include a pulse stretcher for increasing a pulse width of a pulse emitted from a mode locked laser or other source.

a laser source may include a semiconductor laser diode, and pulse widths may be produced in the range of picoseconds to about one microsecond.

a fiber array may include a multi-core fiber.

a multi-core fiber may include a leakage channel fiber.

a leakage channel fiber may be polarization maintaining control signals may be applied at a rate of approximately ten times higher than a pulse repetition rate.

the system may include a signal reference arm and a means for phase compensation, arranged to interfere with a fraction of a beam passing backward through the fiber array, and allowing compensation of the optical phase of each individual array element for a beam passing forward through said fiber array with the means for phase compensation.

a means for phase compensation may include a spatial beam modulator, for example a commercially available spatial light modulator (SLM).

energy coupling between fiber array elements may be less than about 0.1%.

phase-control elements may be configured to modulate the phase of said amplifiers.

a phase-control element may include a phase modulator.

the amplifier system may include a multicore leakage channel fiber (LCF).

the array of amplifiers may be disposed about a common center and approximately equidistant from said center.

a control bandwidth of a phase controller may be less than about 10 KHz.

the amplifier system may include a multicore fiber. The array of amplifiers may be disposed in a single ring near the periphery of said multicore fiber.

phase control elements may form a portion of an integrated phase modulator.

a compact system configuration is obtainable as one result of the low bandwidth phase fluctuations of the fiber outputs. For example, phase control elements may be included with MEMs, SLMs, micromirror arrays, or other integrated devices and/or assemblies.

nearly diffraction limited outputs for pulse widths greater than about 10 fs are obtainable as one result of phase compensation, and as a result of limited mode coupling between fiber amplifiers of the array.

an output pulse width may be in the range of about 100 fs to 1 ns, 100 fs to 10 ps, 1 ps to 1 ns, or about 100 ps to 50 ns.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A high peak power fiber amplifier system, comprising:

an array of fiber amplifiers implemented in the form of a multi-core fiber, said fiber amplifiers being spaced such that thermal fluctuations of said fiber amplifiers are matched sufficiently to limit relative phase fluctuations at fiber amplifier outputs to a bandwidth less than 10 kHz, and such that optical energy coupling between any of the fiber amplifiers of said array of fiber amplifiers is negligible;

a laser source for seeding said array of fiber amplifiers;

a beam distributor disposed between said laser source and said array of fiber amplifiers to distribute a pulse from said laser source into a plurality of beam paths incident on corresponding amplifiers of the array, wherein beams in said path have a spatial distribution substantially similar to the spatial distribution of an output of said laser source;

at least one pump source configured for optically pumping said array of fiber amplifiers;

a plurality of phase-control elements arranged in a spatial relation and optically connected to fiber amplifiers of said array of fiber amplifiers, said elements modifying an optical phase of at least one fiber amplifier output in response to phase-control signals;

a phase control unit for producing said control signals to control the optical phase at the output of a majority of said fiber amplifiers of said array of fiber amplifiers, wherein said control signal and said phase control elements stabilize the optical output phase between the majority of said fiber amplifiers of said array of fiber amplifiers; and an optical combiner which receives phase stabilized pulses from said fiber amplifiers and optically combines said phase stabilized pulses to form a near diffraction limited output beam and a high peak power optical pulse at an output thereof.

2. The high peak power fiber amplifier system according to claim 1, said system comprising a phase plate inserted downstream of the output of said array of fiber amplifiers, so as to maximize the Strehl ratio of the output of said array of fiber amplifiers.

3. The high peak power fiber amplifier system according to claim 1, wherein energy coupling between amplifiers of said array of fiber amplifiers is less than 1%.

4. The high peak power fiber amplifier system according to claim 1, wherein said relative phase fluctuations are less than 1 KHz.

5. The high peak power fiber amplifier system according to claim 1, wherein said phase control unit comprises a detector array and an adaptive algorithm for processing phase information obtained from said detector.

6. The high peak power fiber amplifier system of claim 5, wherein said adaptive algorithm comprises a genetic algorithm.

7. The high peak power fiber amplifier system according to claim 1, wherein said laser source comprises a mode locked laser.

8. The high peak power fiber amplifier system according to claim 7, wherein said laser source comprises a pulse stretcher for increasing a pulse width of a pulse emitted from said mode locked laser.

9. The high peak power fiber amplifier system according to claim 1, wherein said multi-core fiber comprises a leakage channel fiber.

10. The high peak power fiber amplifier system according to claim 9, wherein said leakage channel fiber is a polarization maintaining fiber.

11. The high peak power fiber amplifier system according to claim 1, said system comprising a signal reference arm and a phase compensator, said reference arm being arranged to interfere with a fraction of a beam passing backward through said array of fiber amplifiers so as to provide compensation of the optical phase of each individual fiber amplifier of said array of fiber amplifiers for a beam passing forward through said array of fiber amplifiers with said phase compensator.

12. The high peak power fiber amplifier system according to claim 11, wherein said phase compensator comprises a spatial light modulator.

13. The high peak power fiber amplifier system according to claim 1, wherein energy coupling between fiber amplifiers of said array of fiber amplifiers is less than 0.1%.

14. The high peak power fiber amplifier system according to claim 1, wherein said array of fiber amplifiers is configured in a system for EUV or X-ray generation.

15. The high peak power fiber amplifier system according to claim 14, wherein said system for EUV or X-ray generation is used as a light source in optical lithography.

16. The high peak power fiber amplifier system according to claim 1, wherein said array of fiber amplifiers is configured as a pump source for parametric amplification.

17. The high peak power fiber amplifier system according to claim 1, wherein said fiber amplifiers comprise individual fibers constructed from step-index fiber, photonic crystal fiber or Bragg fibers.

18. The high peak power fiber amplifier system according to claim 1, further comprising side-pumping elements for the amplifier arrays.

19. The high peak power fiber amplifier system according to claim 1, wherein the amplifier is constructed in a double pass configuration.

20. The high peak power fiber amplifier system according to claim 1, wherein a phase-control element comprises a portion of a segmented mirror array.

21. The high peak power fiber amplifier system according to claim 1, wherein a phase-control element comprises a portion of a MEMs array.

22. The high peak power fiber amplifier system according to claim 1, wherein said laser source for seeding said array produces pulses having pulse widths in femtosecond range or in the range from 1 picosecond to one microsecond.

23. The high peak power amplifier system according to claim 1, wherein said output pulses comprise a pulse width in the range from about 100 fs to 1 ns.

24. The high peak power amplifier system according to claim 1, wherein said output pulses comprise a pulse width in the range from about 100 ps to 50 ns.

25. The high peak power fiber amplifier system of claim 1, wherein said array of fiber amplifiers are disposed about a common center and approximately equidistant from said center.

26. The high peak power fiber amplifier system of claim 1, wherein said array of fiber amplifiers is disposed in a single ring and approximately equidistant from a common center.

27. The high peak power fiber amplifier system of claim 1, wherein said phase control elements form a portion of an integrated phase modulator.

28. The high peak power fiber amplifier system of claim 1, wherein nearly diffraction limited outputs are obtainable for pulse widths greater than about 10 fs as a result of phase stabilization.

* * * * *